United States Patent
Geertsen et al.

(10) Patent No.: US 10,407,310 B2
(45) Date of Patent: Sep. 10, 2019

(54) SYSTEM FOR REDUCING AGGLOMERATION DURING ANNEALING OF FLOWABLE, FINELY DIVIDED SOLIDS

(71) Applicant: REC Silicon Inc, Moses Lake, WA (US)

(72) Inventors: Robert J. Geertsen, Eltopia, WA (US); Matthew J. Miller, Moses Lake, WA (US); Justin Johnston, Ellensburg, WA (US); Stein Julsrud, Moses Lake, WA (US); Sefa Yilmaz, Moses Lake, WA (US)

(73) Assignee: REC Silicon Inc, Moses Lake, WA (US)

( * ) Notice: Subject to any disclaimer, the term of this patent is extended or adjusted under 35 U.S.C. 154(b) by 318 days.

(21) Appl. No.: 15/416,291

(22) Filed: Jan. 26, 2017

(65) Prior Publication Data
US 2018/0208471 A1   Jul. 26, 2018

(51) Int. Cl.
*C01B 33/03* (2006.01)
*C01B 33/037* (2006.01)
(Continued)

(52) U.S. Cl.
CPC .......... *C01B 33/037* (2013.01); *F27D 3/0033* (2013.01); *F27D 3/10* (2013.01); *F27D 2003/166* (2013.01)

(58) Field of Classification Search
CPC ................................................... C01B 33/037
See application file for complete search history.

(56) References Cited

U.S. PATENT DOCUMENTS 3,873,337 A * 3/1975 Laufer .................. C01B 13/145
106/481
4,786,477 A * 11/1988 Yoon .......................... B01J 8/42
118/716

(Continued)

FOREIGN PATENT DOCUMENTS

KR          10-0453652       10/2004
KR     10-2011-0119692        3/2007

(Continued)

OTHER PUBLICATIONS

International Search Report and Written Opinion dated Jun. 24, 2018 for PCT/US2018/013890, 13 pages.

(Continued)

*Primary Examiner* — Nathaniel Herzfeld
(74) *Attorney, Agent, or Firm* — Klarquist Sparkman, LLP

(57) ABSTRACT

This disclosure concerns embodiments of an annealing device and a method for annealing flowable, finely divided solids, such as annealing granular silicon to reduce a hydrogen content of the granular silicon. The annealing device comprises at least one tube through which flowable, finely divided solids are flowed downwardly. The tube includes a heating zone and (i) a residence zone below the heating zone, (ii) a cooling zone below the heating zone, or (iii) a residence zone below the heating zone and a cooling zone below the residence zone. An inert gas is flowed upwardly through the tube. The tube may be constructed from two or more tube segments. The annealing device may include a plurality of tubes arranged and housed within a shell. The annealing device and method are suitable for a continuous process.

20 Claims, 11 Drawing Sheets

(51) Int. Cl.
  *F27D 3/00* (2006.01)
  *F27D 3/10* (2006.01)
  *F27D 3/16* (2006.01)

(56) References Cited

U.S. PATENT DOCUMENTS

| | | | |
|---|---|---|---|
| 4,818,495 A * | 4/1989 | Iya | B01J 8/1836 422/145 |
| 4,992,245 A * | 2/1991 | Van Slooten | B01J 8/1836 165/104.16 |
| 5,041,308 A * | 8/1991 | Kuramoto | B01J 8/1836 427/213 |
| 5,149,514 A * | 9/1992 | Sanjurjo | B22F 9/30 423/289 |
| 5,152,556 A | 10/1992 | Holland et al. | |
| 5,242,671 A | 9/1993 | Allen et al. | |
| 5,326,547 A * | 7/1994 | Allen | C01B 33/029 423/349 |
| 5,382,412 A * | 1/1995 | Kim | B01J 8/1854 118/50.1 |
| 5,798,137 A | 8/1998 | Lord et al. | |
| 6,007,869 A * | 12/1999 | Schreieder | B01J 8/1836 427/213 |
| 6,746,655 B1 | 6/2004 | Becker et al. | |
| 6,861,144 B2 | 3/2005 | Wakamatsu et al. | |
| 7,029,632 B1 * | 4/2006 | Weidhaus | B01J 8/1818 165/177 |
| 8,075,692 B2 | 12/2011 | Osborne et al. | |
| 8,444,800 B2 | 5/2013 | Nagaura et al. | |
| 8,535,614 B2 | 9/2013 | Chu | |
| 8,926,929 B2 | 1/2015 | Spangler et al. | |
| 9,446,367 B2 | 9/2016 | Miller et al. | |
| 2002/0081250 A1 | 6/2002 | Lord | |
| 2006/0105105 A1 | 5/2006 | Ibrahim et al. | |
| 2008/0187481 A1 | 8/2008 | Ibrahim et al. | |
| 2009/0047204 A1 * | 2/2009 | Kim | C01B 33/027 423/349 |
| 2009/0311450 A1 | 12/2009 | Nakashima et al. | |
| 2010/0068116 A1 | 3/2010 | Kim et al. | |
| 2011/0212011 A1 | 9/2011 | Chu | |
| 2012/0315390 A1 | 12/2012 | Ohs | |
| 2013/0112134 A1 * | 5/2013 | Spencer | C30B 15/20 117/13 |
| 2013/0115374 A1 | 5/2013 | Jayakar et al. | |
| 2013/0224099 A1 | 8/2013 | Pazzaglia et al. | |
| 2014/0041372 A1 | 2/2014 | Cha et al. | |
| 2014/0318659 A1 | 10/2014 | LeBlond et al. | |
| 2015/0316328 A1 | 11/2015 | Trainham et al. | |
| 2016/0045880 A1 | 2/2016 | Miller et al. | |
| 2016/0129478 A1 | 5/2016 | Geertsen | |

FOREIGN PATENT DOCUMENTS

| | | |
|---|---|---|
| KR | 10-0692444 | 3/2007 |
| KR | 10-2012-0094038 | 8/2012 |
| KR | 10-2013-0044326 | 5/2013 |
| WO | WO 2015/199500 | 12/2015 |
| WO | WO 2017/062949 | 4/2017 |

OTHER PUBLICATIONS

International Search Report and Written Opinion dated Jun. 25, 2018 for PCT/US2018/013888, 12 pages.
International Search Report and Written Opinion dated Jun. 27, 2018 for PCT/US2018/013891, 12 pages.
International Search Report and Written Opinion dated Jul. 9, 2018 for PCT/US2018/013884, 11 pages.
Flowers, et al., "Temperature programmed desorption of molecular hydrogen from a Si(100)-2×1 surface: Theory and experiment," *J. Chem. Phys.*, vol. 99, No. 9, 7038-7048, Nov. 1, 1993. [Apr. 4, 2013].
Henriksen, "Adsorptive Hydrogen Storage: Experimental investigation on thermal conductivity in porous media," *Master Thesis—Master of Energy and Environmental Engineering*, Norwegian University of Science and Technology, 208 pages, 2013.

* cited by examiner

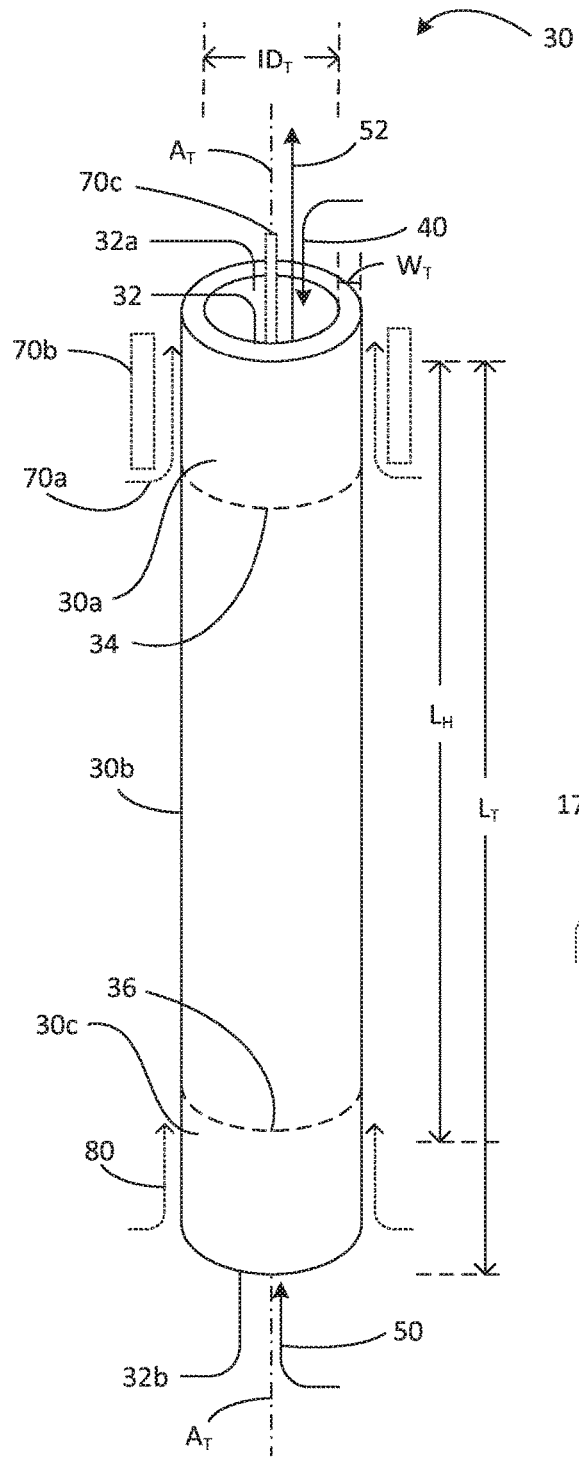
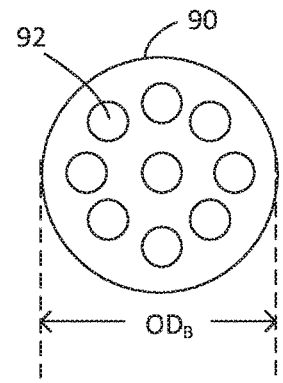
FIG. 3
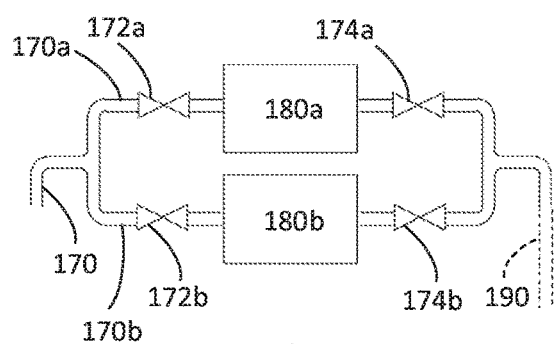
FIG. 4
FIG. 2

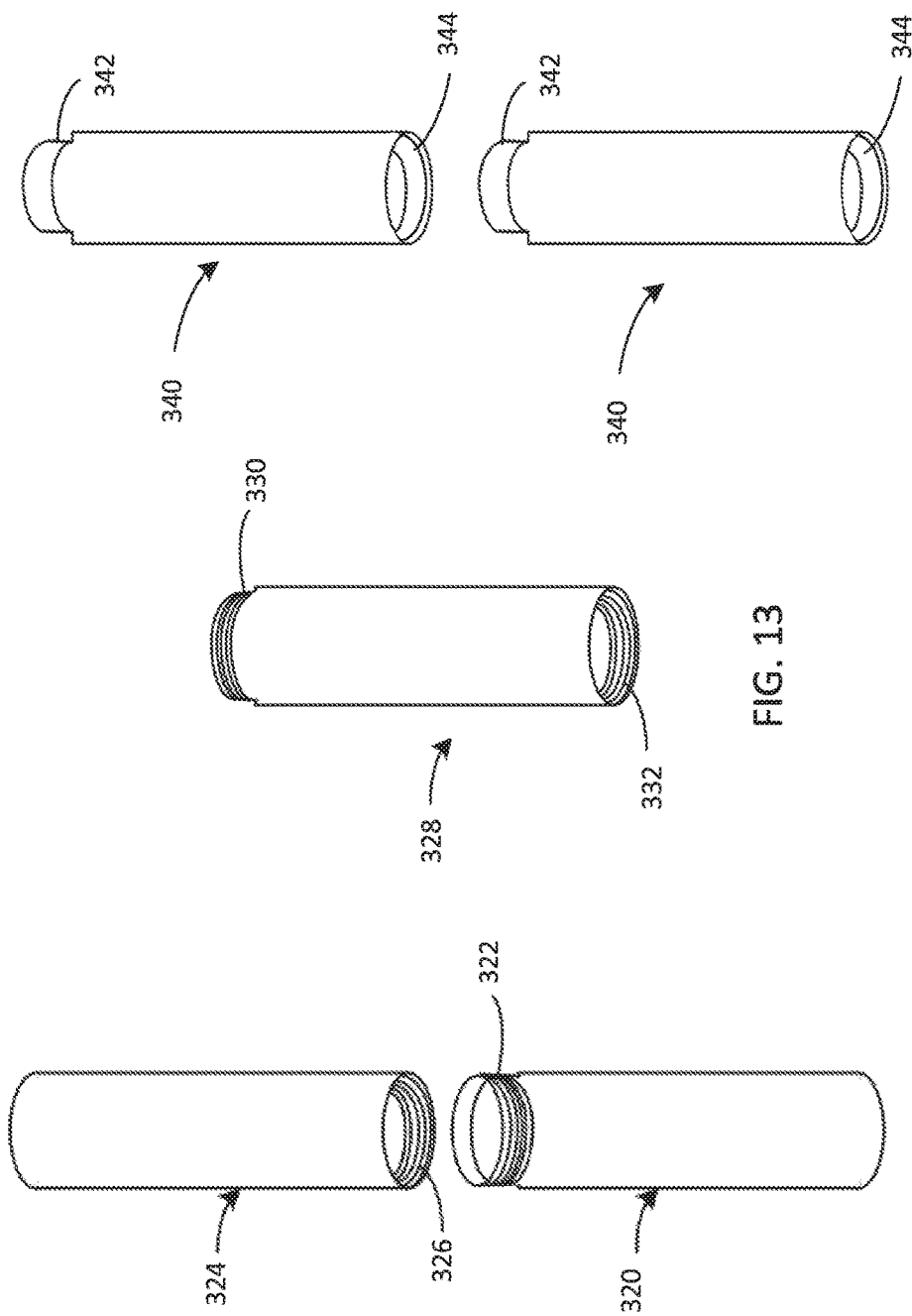

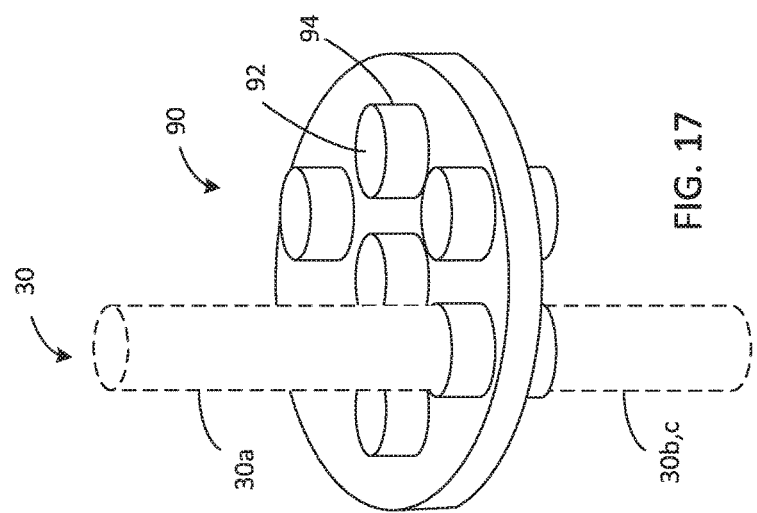
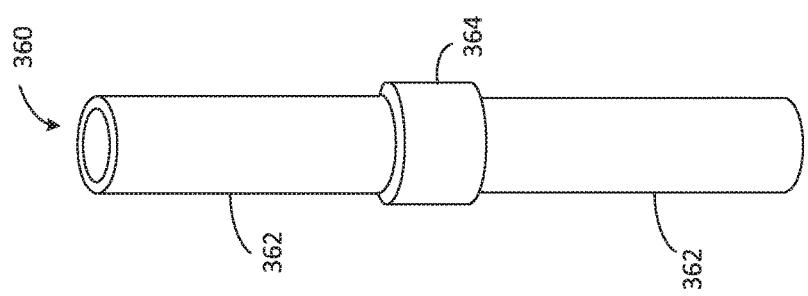
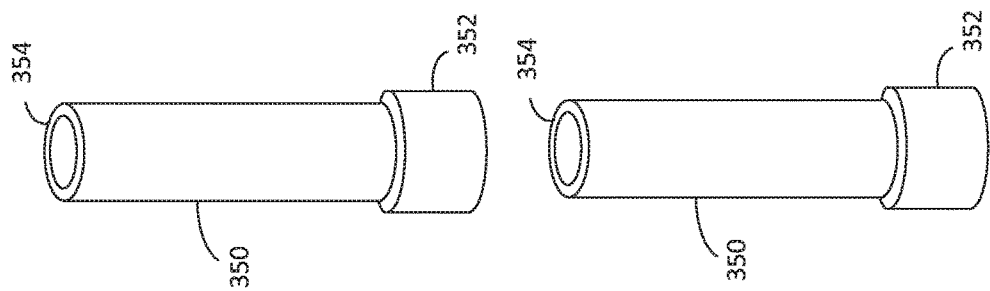

SYSTEM FOR REDUCING AGGLOMERATION DURING ANNEALING OF FLOWABLE, FINELY DIVIDED SOLIDS

FIELD

This disclosure concerns embodiments of a device and method for annealing flowable, finely divided solids, such as annealing granular silicon to reduce a hydrogen content of the granular silicon.

BACKGROUND

Pyrolytic decomposition of silicon-bearing gas in fluidized beds is an attractive process for producing polysilicon for the photovoltaic and semiconductor industries due to excellent mass and heat transfer, increased surface for deposition, and continuous production. Granular silicon prepared by pyrolytic decomposition of a silicon-bearing gas, particularly monosilane, typically comprises a small amount of hydrogen, such as 10-20 ppmw hydrogen. However, electronic-grade granular silicon desirably includes 5 ppmw hydrogen or less. The hydrogen content can be reduced by heat treatments, such as by annealing, whereby hydrogen diffuses out of the silicon. A need exists for a device and method suitable for continuous annealing of granular silicon.

SUMMARY

Embodiments of an annealing device for flowable, finely divided solids include (i) a shell; (ii) one or more tubes arranged within the shell, each tube defining a passageway having an open upper end and an open lower end, and each tube comprising a heating zone; (iii) a heat source for heating the heating zones of the tubes; (iv) an inert gas source in fluid communication with the interior of a lower portion of the shell and, thereby, the open lower end of each tube; (v) a flow-rate controller for controlling a flow rate of inert gas from the inert gas source; and (vi) a metering device coupled to a lower portion of the shell. In some embodiments, each tube further comprises a residence zone located below the heating zone, or a cooling zone located below the heating zone. In any or all of the above embodiments, the annealing device may further include a vibrator positioned to apply a vibratory force to the one or more tubes when the annealing device is in operation. In any or all of the above embodiments, the flowable, finely divided solids may be granular silicon.

In one embodiment, the heat source comprises one or more heaters positioned within the shell at a height corresponding to the height of the heating zones of the tubes. In an independent embodiment, the heat source comprises a heating rod positioned within a portion of the passageway of each tube at a height corresponding to the height of the heating zone.

In some embodiments, the annealing device further includes at least one baffle within the shell, the baffle defining one or more apertures that are dimensioned and positioned to receive the one or more tubes. In certain embodiments, the heating zone has a lower boundary, the at least one baffle is positioned at a height corresponding to the lower boundary of the heating zone, the shell comprises a heating zone inlet at a height above the baffle and a heating zone outlet at a height above the heating zone inlet, and the heat source is a source of heated gas and is in fluid communication with the heating zone inlet.

In some embodiments, each tube further comprises a residence zone located below the heating zone and a cooling zone located below the residence zone, the heating zone has a lower boundary, the cooling zone has an upper boundary, the shell has an upper portion and a lower portion, and the annealing device further comprises a first baffle positioned within the shell at a height corresponding to the heating zone, the first baffle defining a one or more apertures that are dimensioned and positioned to receive the one or more tubes, wherein the first baffle and the upper portion of the shell together define an upper chamber; a second baffle positioned within the shell at a height below the first baffle and at a height corresponding to the lower boundary of the heating zone, the second baffle defining one or more apertures that are dimensioned and positioned to receive the one or more tubes, wherein the first and second baffles together with the shell define a heating chamber; a third baffle positioned within the shell at a height corresponding to the upper boundary of the cooling zone, the third baffle defining one or more apertures that are dimensioned and positioned to receive the one or more tubes, wherein the second and third baffles together with the shell define a residence chamber; and a fourth baffle positioned within the shell at a height below the third baffle, the fourth baffle defining one or more apertures that are dimensioned and positioned to receive the one or more tubes, wherein the fourth baffle and the lower portion of the shell together define a lower chamber. The shell may further include (a) a heating zone inlet located at a height corresponding to the heating chamber; (b) a heating zone outlet located at a height above the heating zone inlet and at a height corresponding to the heating chamber; (c) a cooling zone inlet located at a height corresponding to the cooling chamber; and (d) a cooling zone outlet at a height above the cooling zone inlet and at a height corresponding to the cooling chamber. In some embodiments, the annealing device further includes (i) a source of unheated gas in fluid communication with the cooling zone inlet; (ii) a first conduit in fluid communication with the cooling zone outlet and the heating zone inlet, wherein the heat source is a heater positioned to heat a portion of the first conduit; (iii) a second conduit in fluid communication with the heating zone outlet and the cooling zone inlet; (iv) a cooler positioned to cool a portion of the second conduit; and (v) a blower for circulating a gas through the cooling chamber, the first conduit, heating chamber, and the second conduit.

In any or all of the above embodiments, the tube may be constructed of silicon carbide, silicon nitride, graphite, or a combination thereof. In some embodiments, each of the tubes comprises a plurality of abutted tube segments. Each tube segment may comprise a tubular wall having an annular upper surface and an annular lower surface.

In any or all of the above embodiments, the annealing device may further include a receiving system coupled to the metering device, wherein the receiving system is in fluid communication with the interior of the lower portion of the shell when the metering device is operating. In some embodiments, the finely-divided solids are granular silicon, and surfaces of the receiving system that contact the annealed granular silicon comprise silicon carbide, silicon nitride, or a combination thereof. In any or all of the above embodiments, the annealing device may further include a source of flowable, finely divided solids coupled to an upper portion of the shell.

In any or all of the above embodiments, the annealing device may further include a gas outlet that extends through an upper portion of the shell and is in fluid communication with the open upper end of each of the one or more tubes. In some embodiments, the annealing device further comprises a volatile species trap in fluid communication with the gas outlet.

The foregoing and other objects, features, and advantages of the invention will become more apparent from the following detailed description, which proceeds with reference to the accompanying figures.

BRIEF DESCRIPTION OF THE DRAWINGS

FIG. 2 is a schematic oblique view of a tube of the annealing device of FIG. 1.

FIG. 3 is a top view of a baffle of the annealing device of FIG. 1.

FIG. 4 is a partial schematic cross-sectional view of an annealing device having two volatile species traps in parallel.

FIG. 12 is a schematic exploded oblique view of a first threaded segment and a second threaded segment of a segmented tube.

FIG. 13 is a schematic oblique view of an intermediate threaded segment of a segmented tube.

FIG. 14 is a schematic oblique view of two segments of a segmented tube, wherein the tube ends, when abutted, form a shiplap joint.

FIG. 15 is a schematic oblique view of two segments of a segmented tube, wherein the tube ends, when abutted, form a socket joint.

FIG. 16 is a schematic oblique view of a segmented tube including two tubular segments and a socket.

FIG. 17 is a schematic oblique view of a baffle including sockets for tube segments.

DETAILED DESCRIPTION

Figure 1:
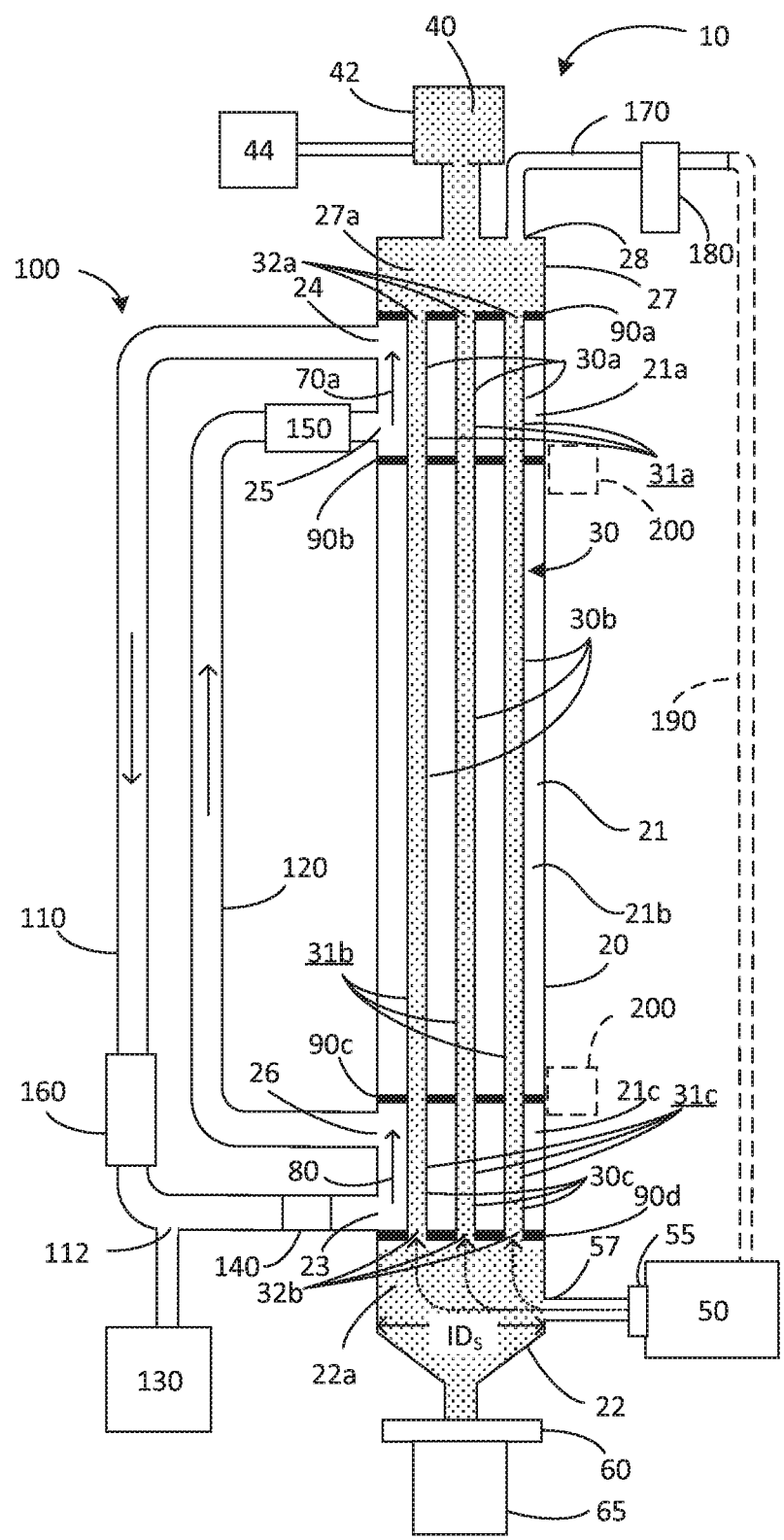
FIG. 1 is a schematic cross-sectional view of an annealing device having a heating zone, a residence zone, and a cooling zone.

An annealing device and method for annealing flowable, finely divided solids are disclosed. In some embodiments, the finely divided solids are granular silicon. Electronic-grade granular silicon desirably includes 5 ppmw hydrogen or less. Embodiments of the disclosed device and method are suitable for removing hydrogen from the granular silicon. In some embodiments, the process is continuous. Exemplary embodiments of the disclosed device and process are capable of annealing more than 400 kg granular silicon per hour to provide granular silicon including 5 ppm hydrogen or less, preferably <1 ppm hydrogen.

I. Definitions and Abbreviations

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing dimensions, quantities, temperatures, times, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods as known to those of ordinary skill in the art. When directly and explicitly distinguishing embodiments from discussed prior art, the embodiment numbers are not approximates unless the word "about" is recited.

Unless otherwise indicated, all percentages referring to a composition or material are understood to be a percent by weight, i.e., % (w/w). Where expressly noted, percentages referring to a substance may be atomic percentages, i.e., the number of atoms per 100 atoms. For example, a substance comprising 1% atomic phosphorus includes one phosphorus atom per one hundred atoms in the substance. Similarly, concentrations expressed as parts per million (ppm) or parts per billion (ppb) are understood to be in terms of weight unless otherwise indicated, e.g., 1 ppmw=1 mg/kg. Where expressly noted, concentrations may be expressed as ppma (ppm atomic) or ppba, e.g., 1 ppma=1 atom in 1,000,000 atoms. In order to facilitate review of the various embodiments of the disclosure, the following explanations of specific terms are provided:

Annealed granular silicon: As used herein, the term "annealed granular silicon" refers to granular silicon comprising 5 ppmw or less hydrogen, e.g., as determined by the inert gas fusion thermal conductivity/infrared detection method described in ASTM method E-1447.

Annealing: As used herein, annealing refers to a heat treatment for flowable, finely divided solids, such as a heat treatment for the reduction or elimination of hydrogen from silicon.

Annealing temperature: As used herein, annealing temperature refers to the temperature of the flowable, finely divided solid material within an annealing tube.

Atomic percent: The percent of atoms (% atomic) in a substance, i.e., the number of atoms of a particular element per 100 atoms of the substance.

Dopant: An impurity introduced into a substance to modulate its electronic properties; acceptor and donor elements replace elements in the crystal lattice of a material, e.g., a semiconductor.

Dwell time: As used herein, dwell time refers to the time that the flowable, finely divided solids are maintained at a desired annealing temperature.

Electronic-grade silicon or polysilicon: Electronic-grade, or semiconductor-grade, silicon has a purity of at least 99.99999 wt %, such as a purity from 99.9999-99.9999999 wt % silicon. The percent purity may not include certain contaminants, such as carbon and oxygen. Electronic-grade silicon typically includes ≤0.3 ppba B, ≤0.3 ppba P, ≤0.5 ppma C, <50 ppba bulk metals (e.g., Ti, Cr, Fe, Ni, Cu, Zn, Mo, Na, K, Ca), ≤20 ppbw surface metals, ≤8 ppbw Cr, ≤8 ppbw Ni, ≤8 ppba Na. In some instances, electronic-grade silicon includes ≤0.15 ppba B, ≤0.15 ppba P, ≤0.4 ppma C, ≤10 ppbw bulk metals, ≤0.8 ppbw surface metals, ≤0.2 ppbw Cr, ≤0.2 ppbw Ni, ≤0.2 ppba Na.

Finely divided solids: As used herein, finely-divided solids refer to solid particles having an average diameter of less than 20 mm, such as an average diameter of 0.25-20, 0.25-10, 0.25-5, or 0.25 to 3.5 mm. As used herein, "average diameter" means the mathematical average diameter of a plurality of particles. Individual particles may have a diameter ranging from 0.1-30 mm.

Flowable: Capable of flowing or being flowed, e.g., from one container to another.

Fluidize: Cause a finely divided solid to acquire the characteristics of a fluid by passing a gas upward through it.

Foreign metal: As used herein, the term "foreign metal" refers to any metal or metalloid other than silicon.

Mass flow rate: The mass of a substance which passes per unit of time. As used herein, mass flow rate is reported in units of kg/hour, $\dot{m}$:

$$\dot{m} = dm/dt.$$

Reaction-bonded silicon carbide (RBSiC): Reaction-bonded silicon carbide may be produced by reacting porous carbon or graphite with molten silicon. Alternatively, RBSiC may be formed by exposing a finely divided mixture of silicon carbide and carbon particles to liquid or vaporized silicon at high temperatures whereby the silicon reacts with the carbon to form additional silicon carbide, which bonds the original silicon carbide particles together. Where contamination is a concern, the liquid or vaporized silicon may be solar-grade or electronic-grade silicon. RBSiC often contains a molar excess of unreacted silicon, which fills spaces between silicon carbide particles, and may be referred to as "siliconized silicon carbide." In some processes, a plasticizer may be used during the manufacturing process and subsequently burned off.

Solar-grade silicon: Silicon having a purity of at least 99.999 wt % atomic. Furthermore, solar-grade silicon typically has specified concentrations of elements that affect solar performance. According to Semiconductor Equipment and Materials International (SEMI) standard PV017-0611, solar-grade silicon may be designated as grade I-IV. For example, Grade IV solar-grade silicon contains <1000 ppba acceptors (B, Al), <720 ppba donors (P, As, Sb), <100 ppma carbon, <200 ppba transition metals (Ti, Cr, Fe, Ni, Cu, Zn, Mo), and <4000 ppba alkali and earth alkali metals (Na, K, Ca). Grade I solar-grade silicon contains <1 ppba acceptors, <1 ppba donors, <0.3 ppma C, <10 ppba transition metals, and <10 ppba alkali and earth alkali metals.

Surface contamination: Surface contamination refers to contamination (i.e., undesired elements, ions, or compounds) within surface layers of a material, such as a silicon carbide segment. Surface layers include the outermost atomic or molecular layer of the material as well as atomic/molecular layers extending inwardly to a depth of 25 μm in the material. Surface contamination may be determined by any suitable method including, but not limited to, scanning electron microscopy, energy dispersive x-ray spectroscopy, or secondary ion mass spectrometry.

Transient time: As used herein, transient time refers to the time required for silicon at the central axis of an annealing tube to reach the desired temperature. In some embodiments, transient time is the time required for silicon at the center of the tube to reach a temperature of at least 900° C.

II. Annealing Device

With reference to FIGS. 1 and 2, embodiments of an annealing device 10 comprise a shell 20, one or more tubes 30, a source of an inert gas 50, and a flow-rate controller 55 for controlling a flow rate of inert gas. The shell 20 defines an interior space 21. The shell has a lower portion 22 that partially defines a lower chamber 22a, and an upper portion 27 that partially defines an upper chamber 27a. A metering device 60 is coupled to the lower portion 22 of the shell 20. In some embodiments, a source 42 of flowable, finely divided solids 40 is coupled to the upper portion 27 of the shell. The annealing device 10 may further include a receiving system 65 coupled to the metering device 60.

The annealing device 10 includes one or more tubes 30 positioned in the interior space 21 defined by the shell 20. In some embodiments, the annealing device 10 includes one or more tubes 30 arranged within the shell 20. In some embodiments, the tubes 30 are arranged in parallel within the shell 20. Each tube 30 defines a passageway 32 having an inner diameter $ID_T$, a central axis $A_T$, an open upper end 32a and an open lower end 32b. Each tube 30 has a heating zone 30a and a residence zone 30b located below the heating zone 30a. A heating boundary 34 is present between the heating zone 30a and the residence zone 30b. Each tube 30 may further comprise a cooling zone 30c located below the residence zone 30b. A cooling boundary 36 is present between the residence zone 30b and the cooling zone 30c. The tube 30 has a length $L_T$. In some embodiments, the tube has a length to inner diameter ($L_T:ID_T$) ratio equal to or greater than 15, such as a ratio≥20, or a ratio≥25. The number of tubes in the annealing device depends, at least in part, on the tube dimensions, the shell dimensions, and a desired capacity of the annealing device. In some embodiments, the annealing device includes at least two tubes, at least five tubes, or at least ten tubes. The annealing device may include, for example, 2-50 tubes, 5-50 tubes 10-40 tubes, or 10-30 tubes.

The shell 20 may be constructed of any material suitable for the operating conditions of the annealing device 10. Advantageously, the material is non-contaminating at the operating temperatures of the annealing device. In some embodiments, the material does not release undesirable levels of boron, aluminum, or phosphorus at the operating temperature of the annealing device. Suitable materials include, but are not limited to, stainless steel or carbon steel. In some embodiments, at least a portion of the shell is insulated. For example, portions of the shell adjacent to the heating zone 30a and residence zone 30b of the tube(s) 30 may be surrounded by thermal insulation material. Desirably, the insulation material is a high efficiency, high temperature insulation. Suitable insulation materials may include a high-temperature blanket, preformed block, jacketed insulation, refractory brick, or other suitable insulation. In certain embodiments (e.g., if the insulation is adjacent to an inner surface of the shell), the insulation is a material that does not off-gas at operating temperatures of the annealing device.

The metering device 60 is coupled to the lower portion 22 of the shell 20. The metering device is operable to control a flow of finely divided solids from the lower chamber 22a into the receiving system 65. Suitable metering devices include, but are not limited to, an angle-of-repose valve, a pinch valve, a ball valve, a vibrating tray, an augur, as well as other metering devices known to those skilled in the art. When the metering device 60 is operating, it is in fluid communication with the lower chamber 22a.

The receiving system 65 may be any suitable system for receiving, storing and/or further processing annealed product, such as annealed granular silicon. In some examples, the receiving system 65 is a receiving hopper, a shipping container, a packaging system, or a conduit for conveying the annealed product to a downstream processing system (e.g., a crystal pulling system, a casting system, a classifying system, among others). The receiving system 65 is in fluid communication with the lower chamber 22a when the metering device 60 is operating. In some embodiments, at least a portion of the interior of the receiving system 65 in maintained under an inert atmosphere, e.g., argon, helium, or nitrogen.

The annealing device 10 further comprises a heat source for heating the heating zone 30a of each of the one or more tubes 30. Exemplary heat sources include, but are not limited to, a source of a heated gas 70a in fluid communication with the heating zone 30a, one or more heaters 70b positioned in the heating chamber 21a adjacent the heating zone 30a, and/or a heating rod 70c positioned within a portion of the passageway 32 corresponding to the heating zone 30a. In certain embodiments, the heat source is a source of heated gas 70a, such as a heater operable to heat a gas, thereby producing the heated gas 70a. The annealing device 10 may further comprise a coolant 80 (e.g., a cooled gas or fluid) in fluid communication with the cooling zone 30c of the tube 30.

With reference to FIGS. 1 and 3, the annealing device 10 may include one or more baffles 90. Each baffle 90 includes one or more apertures 92, each aperture 92 is positioned and cooperatively dimensioned to receive a tube 30. Advantageously, the baffle 90 has an outer diameter $OD_B$ that is substantially the same as the inner diameter IDs of the shell 20, such that the baffle 90 fits tightly within the shell 20. In certain embodiments, when each aperture 92 receives a tube 30, the baffle 90 functions as a gas-tight, or substantially gas-tight, divider in the shell 20. In the exemplary embodiment of FIG. 1, the annealing device 10 includes four baffles 90a, 90b, 90c, and 90d. The first baffle 90a and the upper portion 27 of the shell together define the upper chamber 27a. The first and second baffles 90a and 90b together with the shell 20 define a heating chamber 21a. The second and third baffles 90b and 90c together with the shell 20 define a residence chamber 21b. The third and fourth baffles 90c and 90d together with the shell 20 define a cooling chamber 21c. The fourth baffle 90d and the lower portion 22 of the shell together define the lower chamber 22a.

In some embodiments, a heated gas 70a and a coolant 80 comprising an unheated gas (e.g., at a temperature not greater than 30° C.) flow alongside the outer surface 31a of heating zone 30a and the outer surface 31c of lower cooling zone 30c of each tube 30, respectively. In the exemplary embodiment of FIG. 1, a gas circulation system 100 flows heated gas 70a along an outer surface 31a of the heating zone 30a and flows unheated gas 80 along an outer surface 31c of the cooling zone 30c of each tube 30.

The gas circulation system 100 includes a first conduit 110, a second conduit 120, a gas source 130, a blower 140, a heater 150, and a cooler 160. The first conduit 110 is in fluid communication with the cooling chamber 21c via a cooling zone inlet 23 and the heating chamber 21a via a heating zone outlet 24. The second conduit 120 is in fluid communication with the heating chamber 21a via a heating zone inlet 25 and the cooling chamber 21c via a cooling zone outlet 26. The gas source 130 is in fluid communication with the first conduit 110 via a gas inlet 112. The arrows in FIG. 1 indicate the direction of gas flow.

A blower 140 in the first conduit 110 blows unheated gas 80 through the cooling zone inlet 23 into the cooling chamber 21c. The gas 80 flows upwardly along the outer surface 31c of the cooling zone 30c of each tube 30, absorbing heat from the tube and reducing a temperature of the cooling zone 30c of the tube and the granular silicon 40 within the cooling zone 30c of the tube. The heated gas flows out of the cooling chamber 21c via the cooling zone outlet 26, and then flows upwardly through the second conduit 120. The gas is further heated by a heater 150, and the heated gas 70a flows into the heating chamber 21a via the heating zone inlet 25. The heated gas 70a flows upwardly along the outer surface 31a of the heating zone 30a of each tube 30, thereby transferring heat to the tube 30 and increasing a temperature of the heating zone 30a of the tube. The gas flows out of the heating chamber 21a via the heating zone outlet 24, and is recycled to the first conduit 110. The gas flows downwardly through the first conduit 110 and flows through a cooler 160 prior to flowing again through the blower 140. Supplemental gas is added to the first conduit 110 as needed from gas source 130.

The inert gas source 50 and flow-rate controller 55 are configured to provide an upward flow of inert gas through the passageway 32 of each tube 30. Suitable inert gases include, but are not limited to, argon, helium, and hydrogen. The inert gas source 50 is introduced into the lower chamber 22a via an inert gas inlet 57. Because the lower chamber 22a is in fluid communication with the open lower end 32b of the passageway 32 defined by the tube 30, inert gas 50 flows upward through the passageway 32 and into an upper chamber 27a defined by an upper portion 27 of the shell 20. A gas outlet 28 extends through the upper portion 27 of the shell 20 for venting the upwardly flowing inert gas. In some embodiments, the gas outlet 28 is in fluid communication with a downstream volatile species trap 180. As used herein, "volatile species" refers to a component of the finely divided solids that is volatile at an operating temperature of the annealing device. A conduit 170 connects gas outlet 28 to volatile species trap 180. Optionally, gases that do not condense in the volatile species trap 180 may be recycled to the lower chamber 22a via conduit 190 and flow-rate controller 55. In an independent embodiment as illustrated in FIG. 4, the conduit 170 bifurcates into first and second conduits 170a, 170b connecting gas outlet 28 to two volatile species traps 180a, 180b in parallel. Four flow valves 172a, 172b, 174a, 174b allow flow to be directed to either, or both, of the volatile species traps 180a, 180b. In some examples, eight valves may be used to provide double isolation and facilitate removal of one volatile species trap from service for cleaning while the second volatile species trap remains operational. In certain examples, the flow valves are isolation valves.

The annealing device 10 may further include one or more vibrators 200 configured to transmit a vibratory force to the tubes 30, thereby vibrating the tubes 30. Exemplary vibrators include, but are not limited to, an external electromechanical or pneumatic-mechanical vibratory device. In some embodiments, e.g., as illustrated in FIG. 1, the vibrator 200 is positioned adjacent a baffle. For instance, a vibrator 200 may be positioned adjacent baffle 90b and/or 90c. The vibrator 200 may be in physical contact with the shell 20 at a height corresponding to the baffle position. Vibrations are transmitted through the baffle(s) to the tubes 30.

In some embodiments, the flowable, finely divided solid material 40 is purged with an inert gas prior to entering the tube 30. Accordingly, an inert gas source 44 may be fluidly connected to the finely divided solids source 42 (e.g., a delivery vessel, such as a mass-flow hopper of granular silicon).

Figure 5:
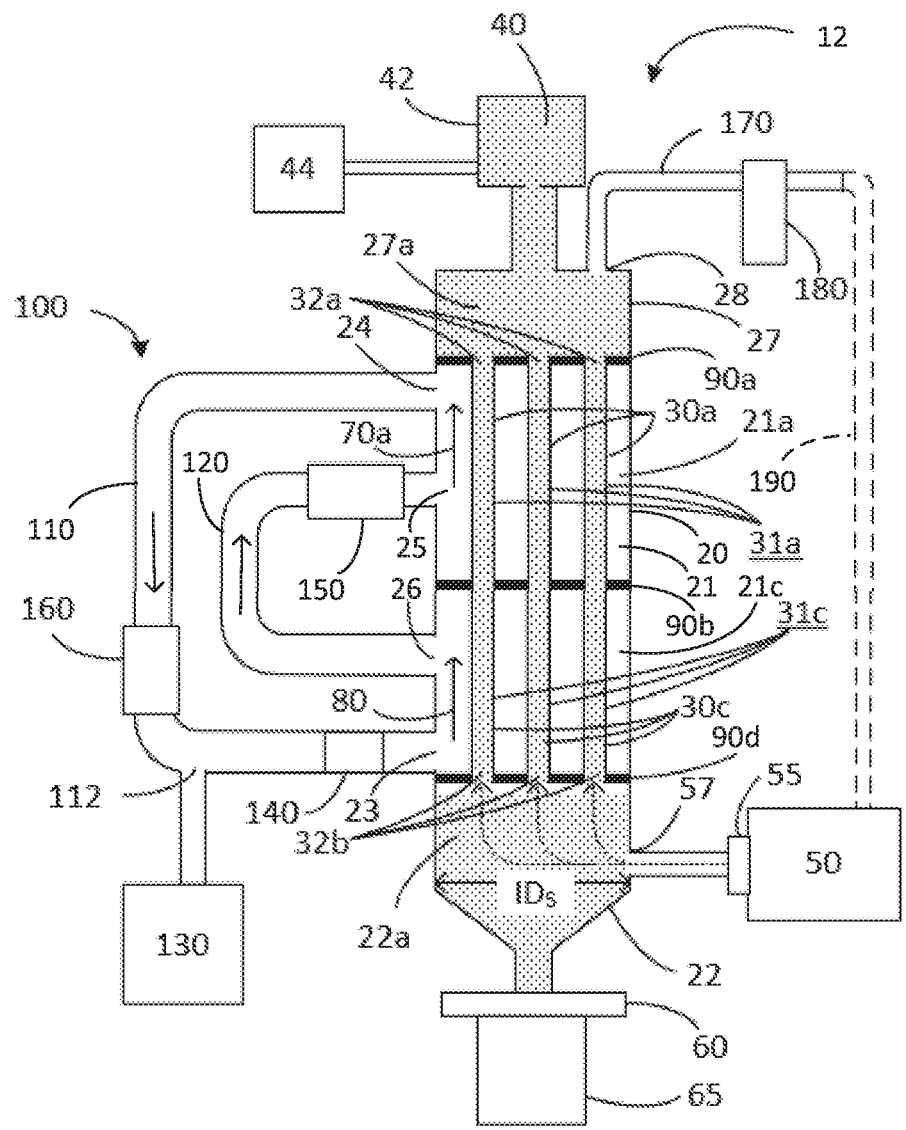
FIG. 5 is a schematic cross-sectional view of an annealing device having a heating zone and a cooling zone.

In an independent embodiment as shown in FIG. 5, an annealing device 12 comprises a shell 20, one or more tubes 30, a source of an inert gas 50, and a flow-rate controller 55 for controlling a flow rate of inert gas. The shell 20 defines an interior space 21. The annealing device 12 includes one or more tubes 30 positioned in the interior space 21 defined by the shell 20. Each tube 30 has a heating zone 30a and a cooling zone 30c located below the heating zone 30a.

In the exemplary embodiment of FIG. 5, the annealing device 12 includes three baffles 90a, 90b, and 90d. Baffle 90a and the upper portion 27 of the shell together define the upper chamber 27a. Baffles 90a and 90b together with the shell 20 define a heating chamber 21a. Baffles 90b and 90d together with the shell 20 define a cooling chamber 21c. Baffle 90d and the lower portion 22 of the shell together define the lower chamber 22a. A heated gas 70a and a coolant 80 comprising an unheated gas (e.g., at a temperature not greater than 30° C.) flow alongside the outer surface 31a of heating zone 30a and the outer surface 31c of lower cooling zone 30c of each tube 30, respectively. A gas circulation system 100, as described supra, flows heated gas 70a along an outer surface 31a of the heating zone 30a and flows unheated gas 80 along an outer surface 31c of the cooling zone 30c of each tube 30. A vibrator (not shown) may be positioned adjacent baffle 90b. Other components of FIG. 5 are as described supra with respect to FIG. 1.

Figure 6:
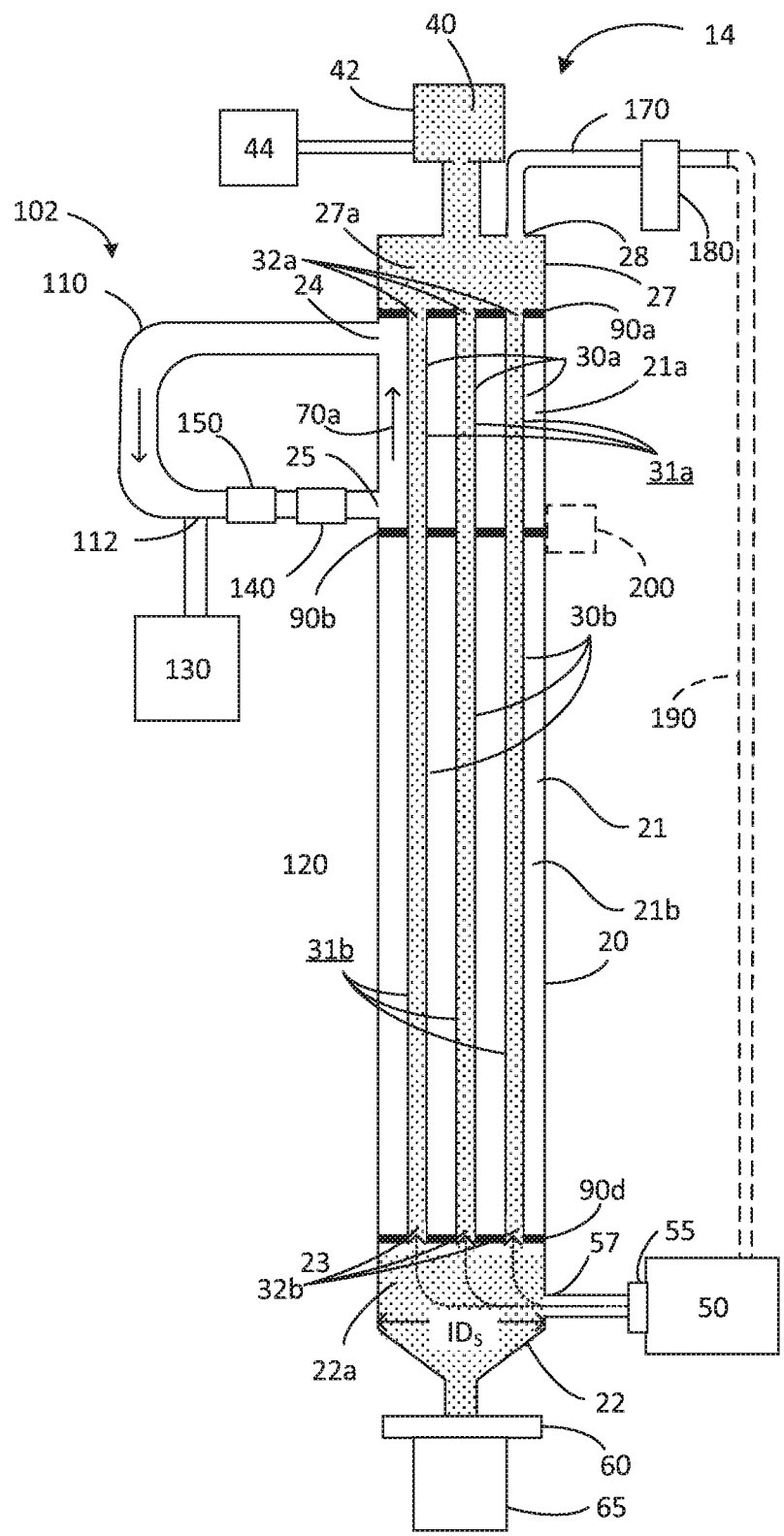
FIG. 6 is a schematic cross-sectional view of an annealing device having a heating zone and a residence zone.

In an independent embodiment as shown in FIG. 6, an annealing device 14 comprises a shell 20, one or more tubes 30, a source of an inert gas 50, and a flow-rate controller 55 for controlling a flow rate of inert gas. The shell 20 defines an interior space 21. The annealing device 14 includes one or more tubes 30 positioned in the interior space 21 defined by the shell 20. Each tube 30 has a heating zone 30a and a residence zone 30b located below the heating zone 30a.

In the exemplary embodiment of FIG. 6, the annealing device 14 includes three baffles 90a, 90b, and 90d. Baffle 90a and the upper portion 27 of the shell together define the upper chamber 27a. Baffles 90a and 90b together with the shell 20 define a heating chamber 21a. Baffles 90b and 90d together with the shell 20 define a residence chamber 21b. Baffle 90d and the lower portion 22 of the shell together define the lower chamber 22a. A gas circulation system 102 flows heated gas 70a along an outer surface 31a of the heating zone 30a. The gas circulation system 102 includes a conduit 110, a gas source 130, a blower 140, and a heater 150. The gas source 130 is in fluid communication with the conduit 110 via a gas inlet 112. Gas from the gas source 130 flows through the heater 150. The blower 140 blows heated gas 70a into the heating chamber 21a via the heating zone inlet 25. The arrows in FIG. 5 indicate the direction of gas flow. The heated gas 70a flows upwardly along the outer surface 31a of the heating zone 30a of each tube 30, thereby transferring heat to the tube 30 and increasing a temperature of the heating zone 30a of the tube. The gas flows out of the heating chamber 21a via the heating zone outlet 24, and is recycled to the conduit 110. The gas flows downwardly through the conduit 110 and flows through the heater 150 to be reheated prior to flowing again through the blower 140. Supplemental gas is added to the conduit 110 as needed from gas source 130. A vibrator 200 may be positioned adjacent baffle 90b. Other components of FIG. 6 are as described supra with respect to FIG. 1.

Advantageously, when the flowable, finely divided solid material is granular silicon, all surfaces in contact with the granular silicon are constructed of, or coated with, a non-contaminating material. For example, inner surfaces of the tubes 30, granular silicon source 40, and lower portion 22 of the shell 20 comprise a non-contaminating material. Surfaces of the metering device 60 and receiving system 65 that contact granular silicon also are constructed of, or coated with, a non-contaminating material. Suitable non-contaminating materials are chemically inert and temperature-resistant at operating temperatures of the annealing devices. Exemplary non-contaminating materials include silicon carbide and silicon nitride. The silicon carbide may be reaction-bonded silicon carbide (RBSiC), nitride-bonded silicon carbide, or sintered silicon carbide. In regions with lower temperatures (e.g., metering device 60, receiving system 65), surfaces that contact granular silicon may be coated with a high-purity polyurethane.

In some embodiments, the contact surfaces are constructed of, or coated with, silicon carbide, such as RBSiC. In certain embodiments, the RBSiC has surface contamination levels of less than 3% atomic of dopants and less than 5% atomic of foreign metals. Dopants found in RBSiC include B, Al, Ga, Be, Sc, N, P, As, Ti, Cr, or any combination thereof. In some embodiments, contact surfaces have a surface contamination level of less than 3% atomic of dopants B, Al, Ga, Be, Sc, N, P, As, Ti, and Cr, combined. The contact surfaces advantageously have a surface contamination level comprising less than 1% atomic of phosphorus, less than 1% atomic of boron, less than 1% atomic of aluminum, and less than 5% atomic of total foreign metals as measured by EDX/SEM.

III. Annealing Tubes

As shown in FIG. 2, a tube 30 has an inner diameter $ID_T$, an overall length $L_T$, and a lengthwise central axis $A_T$. In some embodiments, good results are obtained when the central axis $A_T$ is vertical. The tube includes a heating zone 30a. In the illustrated embodiment of FIGS. 1 and 2, the tube further includes a residence zone 30b located below the heating zone 30a and a cooling zone 30c located below the residence zone 30b. In certain embodiments (e.g., as shown in FIGS. 5 and 6), the tube further includes a residence zone 30b or a cooling zone 30c located below the heating zone 30a. The illustrated tube 30 has a wall with cylindrical inner and outer surfaces having axes that coincide with axis $A_T$. The tube defines a passageway 32 having an open upper end 32a and an open lower end 32b.

Although the inner and outer wall surfaces of exemplary tube 30 of FIG. 2 have cross-sections perpendicular to axis $A_T$ that are circular, it is understood that other cross-sectional geometries are encompassed by this disclosure. For example, the tube and/or the passageway may have an oval cross-section or a polygonal cross-section, e.g., a square, pentagon, hexagon, octagon, among others. Although the exemplary tube 30 of FIG. 2 has a constant inner diameter $ID_T$ throughout the length $L_T$ of the tube, it is understood that other configurations are encompassed by this disclosure. For example, the tube may have a greater inner diameter at the upper end of the tube than at the lower end of the tube. Alternatively, the tube may have an inner diameter in a central portion of the tube that is larger or smaller than an inner diameter at the upper end and/or lower end of the tube. Similarly, while the exemplary tube of FIG. 2 is cylindrical, it is understood that other geometries also are encompassed by this disclosure. For example, the tube may have a coiled geometry. Furthermore, the above-described tube variations may be present in any combination. For example, a coiled tube may have a varying inner diameter throughout its length, and/or a cross-sectional geometry other than a circular cross-section.

The tube 30 is constructed of (consists of), or has an inwardly facing surface coated with, a non-contaminating material. In some embodiments, suitable materials include silicon carbide, silicon nitride, or graphite having an inwardly facing surface coated with a non-contaminating material (e.g., silicon carbide). The silicon carbide may be RBSiC or nitride-bonded silicon carbide. In certain embodiments, the material is RBSiC.

As described in detail infra, a flowable, finely divided solid material 40 is annealed as it flows downwardly through the passageway 32. In some embodiments, the solid material is silicon granules having an average diameter of 0.25 to 20 mm. The length $L_T$ of the tube 30 and the flow rate of the flowable, finely divided solids 40 are selected to provide sufficient time for the annealing process. In some embodiments, the length $L_H$ of the heating zone 30a and residence zone 30b and the solids flow rate are selected to provide a granular silicon residence time of at least 5 minutes at a temperature of 900-1400° C. The annealing device includes a metering device 60, which controls the solids flow rate. The inner diameter $ID_T$ and wall thickness $W_T$ of the tube 30 are selected to facilitate heat transfer from the heating zone 30a of the tube to the solids 40 throughout a cross-section of the passageway 32.

In some embodiments, the tube 30 has a length $L_T$ within a range of 1-5 m, such as a length $L_T$ of 1-3 m. The tube 30 may have an inner diameter $ID_T$ within a range of 2-20 cm, such as an $ID_T$ of 5-15 cm. For example, the tube may have an $ID_T$ of 10 cm and a length L of 1.5-3 m. In certain embodiments, the tube 30 has a heated length $L_H$ from 1.5 m to 2 m, where the heated length $L_H$ includes the heating zone 30a and the residence zone 30b. Because the tube 30 has a considerable length, it may be useful to construct the tube from a plurality of tube segments.

Figure 7:
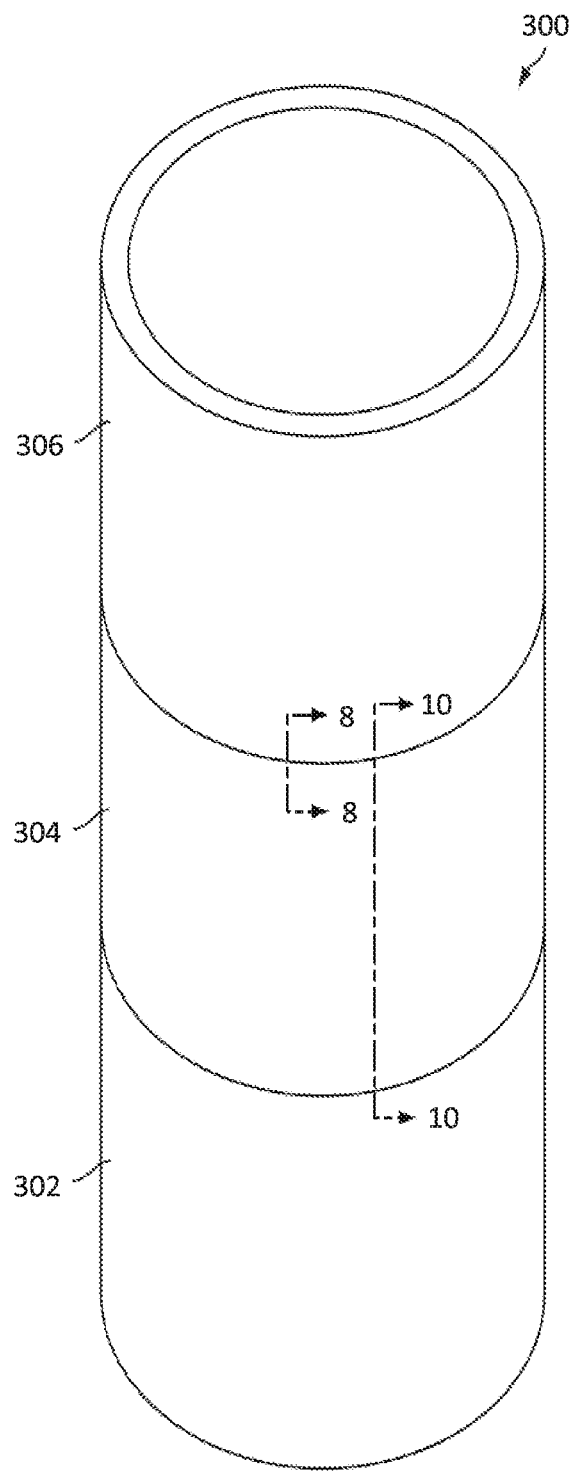
FIG. 7 is a schematic oblique view of a segmented tube including plural stacked segments.
Figure 8:
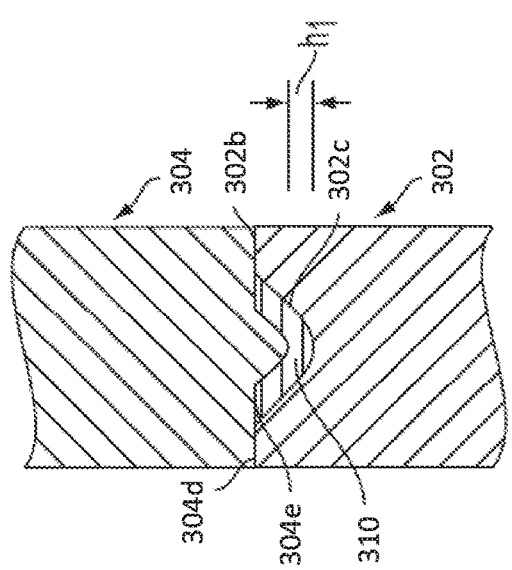
FIG. 8 is a schematic partial cross-sectional view, taken along line 8-8 of FIG. 7, showing the boundary between two vertically abutted segments.

A segmented tube 300 for use in an annealing device may comprise a first segment 302 and a second segment 304 stacked on top of the first segment 302 (FIGS. 7-10). The second tube segment 304 is axially aligned with and abutted to the first tube segment 302 such that the first tube segment and the second tube segment together define a passageway that extends through the tube. The joint between the stacked segments 302, 304 may be gas tight. A volume of sealing material 310 may be disposed between abutting edge surfaces of the first and second segments (FIG. 8). In the embodiment of FIG. 8, the first, or lower, segment 302 has a first segment upper edge surface 302b defining an upwardly opening first segment depression 302c. In some embodiments, the first segment 302 has a lower edge surface (not shown) that is flat (i.e., the lower edge surface does not include a depression or a protrusion). The second segment 304 is located above and abutted to the first segment 302. The second segment 304 has a second segment lower edge surface 304d defining a downwardly extending second segment protrusion 304e received within the first segment depression 302c. The first segment depression 302c and second segment protrusion 304e are female and male joint portions, respectively. In some examples, the joint portions have a tongue-and-groove configuration, wherein the first segment depression 302c corresponds to the groove and the second segment protrusion 304e corresponds to the tongue.

The second segment protrusion 304e has smaller dimensions than the first segment depression such that, when the protrusion 304e is received in the depression 302c, the surface of the first segment depression is spaced apart from the surface of the second segment protrusion and a space is located between the second segment protrusion 304e and the first segment depression 302c. The space has a suitable size to accommodate a volume of sealing material. Although the sealing material can bond the first segment to the second segment in the absence of a space, the space facilitates even distribution of the sealing material and allows excess sealing material to flow out and be removed as pressure is applied to the segments. In the absence of a space between the depression and protrusion, the sealing material may not distribute evenly, creating high and low points. A high area of sealing material with a small contact area creates an area of high pressure or stress as the segments are brought into abutment, which may cause the segment(s) to break. In some examples, the space has a height hi, measured vertically, of 0.2-0.8 mm, such as a height of 0.4-0.6 mm. The sealing material 310 is disposed within the space between the second segment protrusion 304e and the first segment depression 302c.

A person of ordinary skill in the art understands that, in an alternate arrangement, the protrusion may extend upwardly from the lower segment and the depression may be located on the lower edge surface of the upper segment, i.e., the first segment upper edge surface 302b may define an upwardly extending first segment protrusion 302c and the second segment lower edge surface 304d may define a downwardly opening depression 304e.

Figure 9:
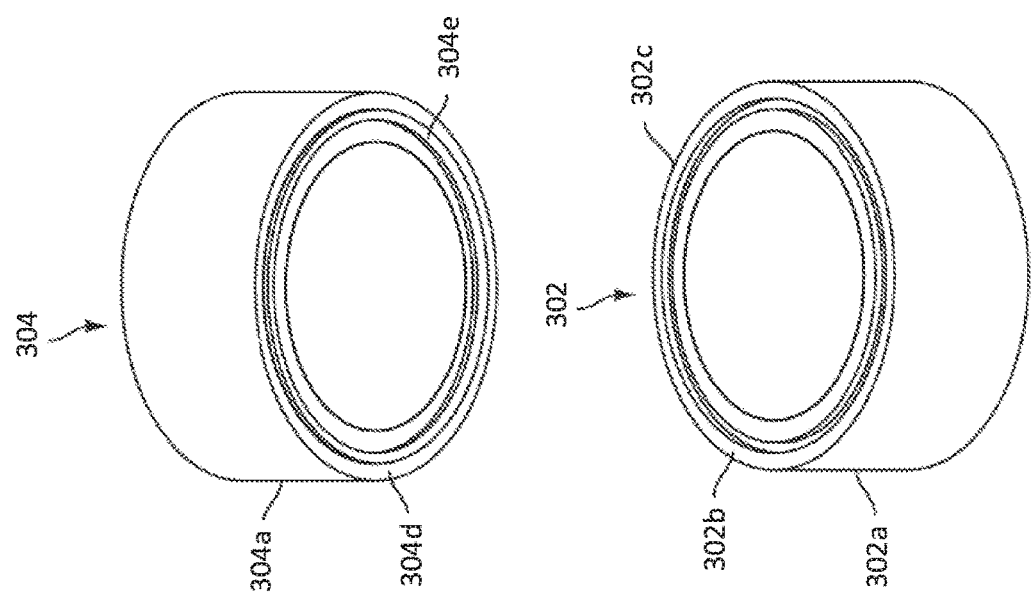
FIG. 9 is a schematic exploded oblique view of a first segment and a second segment of the segmented tube of FIG. 7.

In some examples, the first segment 302 comprises a first tubular wall 302a having an annular upper surface 302b (FIG. 9). The first segment upper edge surface 302b is at least a portion of the annular upper surface, and the first segment depression 302c is a groove that is defined by and extends along at least a portion of the first segment upper edge surface 302b. In some embodiments, the depression 302c extends as a ring around the entire annular upper surface. The second segment 304 comprises a second tubular wall 304a having an annular lower surface 304d (FIG. 9). The second segment lower edge surface 304d is at least a portion of the annular lower surface, and the second segment protrusion 304e extends downwardly from and along at least a portion of the second segment lower edge surface 304d. In some embodiments, the protrusion 304e extends as a ring around the entire annular lower surface 304d.

In some embodiments, the segmented silicon carbide tube comprises one or more additional silicon carbide segments. In the example shown in FIG. 7, the tube 300 comprises three silicon carbide segments 302, 304, 306. Each of the segments may have a tubular, or substantially cylindrical, configuration. A person of ordinary skill in the art understands that the segmented tube may include two, three, four, or more than four segments. The number of segments is determined, at least in part, by the desired height of the tube and the height of the individual segments. Manufacturing limitations may determine the height of individual segments.

Figure 10:
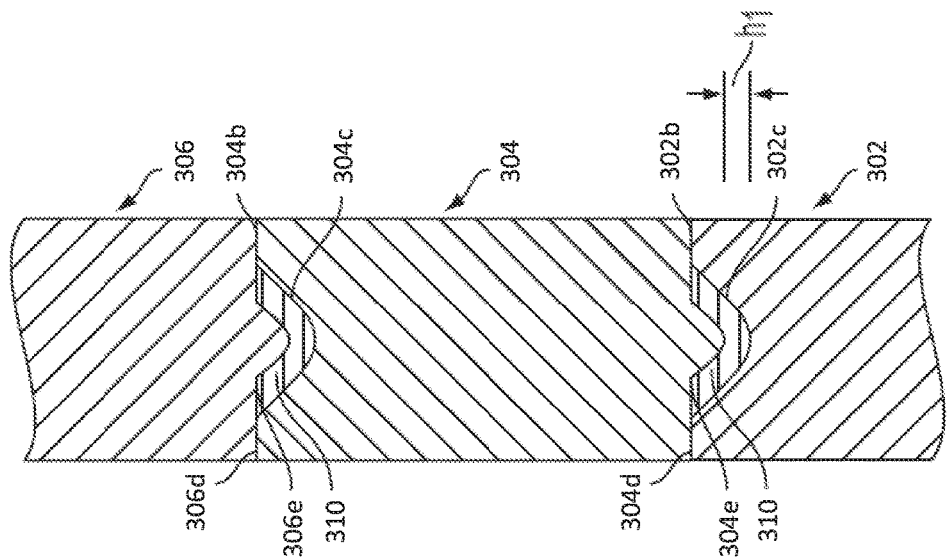
FIG. 10 is a schematic cross-sectional view, taken along line 10-10 of FIG. 7, of a portion of a segmented tube illustrating three vertically abutted segments.

As shown in FIG. 10, a segment 304 positioned between two adjacent segments 302, 306 may have an upper edge surface 304b defining an upwardly opening segment depression 304c and a lower edge surface 304d defining a downwardly extending segment protrusion 304e. The protrusion 304e is received within an upper edge surface depression 302c defined by an upper edge surface 302b of an adjacent segment 302 located below and abutted to the segment 304. The protrusion 304e has smaller dimensions than the depression 302c of the adjacent silicon carbide segment 302 such that the surface of the adjacent segment depression 302c is spaced apart from the surface of the protrusion 304e and a space is located between the protrusion 304e and the depression 302c of the adjacent segment 302. A volume of sealing material 310 is disposed within the space. Similarly the depression 304c receives a protrusion 306e defined by a lower edge surface 306d of an adjacent segment 306 located above and abutted to the segment 304. The protrusion 306e has smaller dimensions than the depression 304c such that the surface of the depression 304c is spaced apart from the surface of the protrusion 306e and a space is located between the protrusion 306e and the depression 304c. A volume of sealing material 310 is disposed within the space.

In some embodiments (not shown), a segmented tube comprises a plurality of vertically stacked segments alternating between segments having protrusions on both of the upper and lower edge surfaces and segments having depressions on both of the upper and lower edge surfaces.

Figure 11:
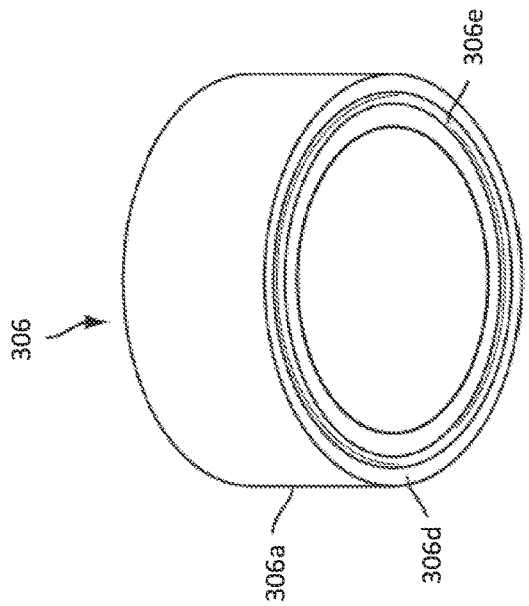
FIG. 11 is a schematic oblique view of a terminal segment.

In some examples, a segmented tube 300 includes an uppermost or terminal segment, e.g., segment 306 of FIG. 7 that has a tongue or groove only on the downwardly facing annular surface. FIGS. 10 and 11 show a top terminal segment 306 that has a terminal segment lower edge surface 306d defining a downwardly extending terminal segment protrusion 306e. The terminal segment protrusion 306e is received within an adjacent segment depression, e.g., second segment depression 304c, and has smaller dimensions than the adjacent segment depression such that the surface of the adjacent segment depression is spaced apart from the surface of the terminal segment protrusion 306e and a space is located between the terminal segment protrusion 306e and the adjacent segment depression. A volume of sealing material 310 is disposed within the space. The terminal segment 306 need not have an upper edge surface defining a depression or protrusion; instead the upper edge surface may be substantially planar as shown in FIG. 7. Although FIGS. 7 and 10 illustrate terminal segment 306 abutted to second segment 304, a person of ordinary skill in the art understands that one or more additional segments may be stacked in layers between segments 304 and 306. Advantageously, each additional segment has a configuration substantially similar to segment 304 with an upwardly opening segment depression defined by its upper edge surface and a downwardly extending segment protrusion defined by its lower edge surface. Terminal segment 306 is located above, abutted to, and rests on the adjacent segment immediately below it.

In some embodiments, a segmented tube is formed from two or more threaded segments. FIG. 12 illustrates a first threaded segment 320 including external threads 322 on an outer wall. A second threaded segment 324 includes internal threads 326 on an inner wall. Threads 326 are cooperatively dimensioned to engage with threads 322 such that first segment 320 and second segment 324 can be fitted together. When the segmented tube includes more than two segments, intermediate segments 328 positioned between first segment 320 and second segment 324 include external threads 330 on an outer wall and internal threads 332 on an inner wall (FIG. 13). Threads 330 and 332 are cooperatively dimensioned to engage with threads on adjacent intermediate segments 328 as well as with threads on first and second segments 320 and 324.

In an independent embodiment, a segmented tube is formed from two or more segments, wherein the segments are joined by shiplap joints. FIG. 14 illustrates two exemplary tubular segments 340, wherein the male and female ends 342, 344 of the tubular segments, when abutted, form a shiplap joint. The joint may be formed without a sealing material, or a sealing material may be disposed between abutting surfaces of the male and female ends 342, 344.

In another independent embodiment as shown in FIG. 15, a segmented tube is formed from two or more tubular segments 350, wherein a first end 352 of the tubular segment 350 has a larger cross-section than a second end 354 of the tubular segment, thereby forming a socket, which receives the second end 354 of an adjacent tubular segment 350. Advantageously, the first end 352, or socket, provides a gas-tight or substantially gas-tight fit around the second end 354 of the adjacent tubular segment. The joint may be formed without a sealing material, or a sealing material may be disposed between abutting surfaces of ends 352, 354.

In another independent embodiment, a segmented tube 360 is formed from two tubular segments 362 and a socket 364. In some embodiments, the segmented tube may include more than two tubular segments with a socket for joining each pair of adjacent segments. Advantageously, the socket 364 provides a gas-tight or substantially gas-tight fit around the tube segments 362. The joint may be formed without a sealing material, or a sealing material may be disposed between abutting surfaces of segment 360 and socket 362.

In still another independent embodiment, two segments of a tube 30, e.g., a heating zone segment 30a and a residence zone segment 30b or cooling zone segment 30c may be joined via socket joints using a baffle comprising sockets. FIG. 17 shows an exemplary baffle 90 comprising a plurality of sockets 94, each socket defining an aperture 92 extending through the baffle 90. The socket 94 is cooperatively dimensioned to receive a segment (30a, 30b, 30c) of tube 30. Advantageously, the socket 94 provides a gas-tight or substantially gas-tight fit around the tube segment.

In some embodiments, one or more of the tube segments is formed from SiC. Advantageously, one of more of the tube segments is formed from reaction-bonded SiC, the RBSiC having a surface contamination level of less than 1% atomic of boron, less than 1% atomic of phosphorus, less than 1% atomic of aluminum, and less than 5% atomic of total foreign metals as measured by EDX/SEM. The RBSiC may be substantially devoid of boron, phosphorus, and/or aluminum. As used herein, "substantially devoid" means that that the RBSiC includes a total of less than 3% atomic of B, P, and Al, such as a total of less than 1% atomic B, P, and Al.

Suitable sealing materials for joining tube segments include, but are not limited to, elemental silicon, a curable sealing material comprising a lithium salt (e.g., lithium silicate), a gasket ring (e.g., a graphite gasket ring), a compressed packing material (e.g., graphite). Alternatively, the sealing material may be a coating, such as a silicon carbide coating, extending across at least a portion of the joint.

In one embodiment, the sealing material is a gasket ring, e.g., a graphite gasket ring. In an independent embodiment, the sealing material is a compressed packing material, e.g., graphite. The graphite may be a graphite powder, such as a graphite powder having an average particle size of less than 1 mm, less than 500 µm, or less than 250 µm.

In another independent embodiment, the sealing material is elemental silicon having a purity of at least 99.999%. The elemental silicon may be solar-grade or electronic-grade silicon. Advantageously, the silicon includes less than 1% atomic of phosphorus, less than 1% atomic of boron, and less than 1% atomic of aluminum. Prior to sealing, the elemental silicon may be a powder, granules, chunks, or a wire. For example, the elemental silicon may be a powder having an average particle size of less than 250 µm or granules having an average diameter of 0.25 to 20 mm.

In yet another independent embodiment, the sealing material is a curable sealing material comprising a lithium salt. The uncured sealing material may comprise 2500-5000 ppm lithium, such as from 3000-4000 ppm lithium. The lithium salt may be lithium silicate. The uncured sealing material may be an aqueous slurry or paste comprising lithium silicate. The sealing material may further comprise a filler material. Desirably, the filler material does not produce significant contamination of the product during operation of the annealing device. Advantageously, the filler material has a thermal coefficient of expansion similar to the tube material (e.g., SiC) to reduce or eliminate separation of the sealing material from the tube segment surfaces when heated. Suitable filler materials include silicon carbide particles. The sealing material may also include a thickening agent to provide a desired viscosity. The sealing material advantageously has a spreadable consistency with sufficient viscosity to minimize undesirable running or dripping from coated surfaces. In some embodiments, the sealing material has a viscosity from 3.5 Pa·s to 21 Pa·s at 20° C., such as a viscosity from 5-20 Pa·s, 5-15 Pa·s, or 10-15 Pa·s at 20° C. In some examples, the sealing material includes aluminum silicate powder as a thickening agent. When cured, the sealing material may comprise lithium aluminum silicate and silicon carbide, such as 0.4-0.7 wt % lithium and 93-97 wt % silicon carbide. The cured sealing material may further include lithium aluminum silicate, aluminum silicate, cristobalite ($SiO_2$), or a combination thereof. In some examples, the cured sealing material comprises 1.8-2.4 wt % lithium aluminum silicate, 2.0-2.5 wt % aluminum silicate, and 0.4-0.8 wt % cristobalite. In some examples, the uncured sealing material is an aqueous slurry comprising 2500-5000 ppm lithium as lithium silicate, 700-2000 ppm aluminum as aluminum silicate, and silicon carbide particles. The slurry has a viscosity from 3.5 Pa·s to 21 Pa·s at 20° C. In certain embodiments, the sealing material is an aqueous slurry comprising 3000-4000 ppm lithium as lithium silicate, 1000-1500 ppm aluminum as aluminum silicate, and silicon carbide powders.

Two segments may be joined by applying a sealing material to at least a portion of an edge surface of a first segment to form a coated edge surface. At least a portion of the edge surface of the first segment is brought into abutment with at least a portion of an edge surface of a second segment with at least a portion of the sealing material positioned between the abutting edge surfaces of the first segment and the second segment. In some embodiments, the abutted edges of the first and second segments define male and female joint portions (e.g., a protrusion and a depression) cooperatively dimensioned to provide a space between the male and female joint portions when the edges are abutted, wherein the sealing material is disposed within the space (FIGS. 8-10). In an independent embodiment, the abutted edges of the first and second segments are threads positioned and cooperatively dimensioned to engage with one another (e.g., FIGS. 12 and 13).

In some embodiments, a coated edge surface is formed by applying elemental silicon (e.g., silicon powder, granules, or chunks, or a silicon filament) to at least a portion of an upper edge surface of a first tube segment constructed of reaction-bonded silicon carbide, silicon nitride, nitride-bonded silicon carbide, or a combination thereof. Heat is applied to the elemental silicon to form molten elemental silicon. Heat can be applied by any suitable method including, but not limited to, induction heating, a halogen lamp, or a laser. The coated portion of the upper edge surface of the first tube segment is brought into abutment with at least a portion of a lower edge surface of a second tube segment constructed of reaction-bonded silicon carbide, silicon nitride, nitride-bonded silicon carbide, or a combination thereof, such that at least a portion of the molten elemental silicon is positioned between the abutting edge surfaces of the first tube segment and the second tube segment. The molten silicon is cooled sufficiently by contact with the second tube segment to solidify, thereby forming bonded first and second tube segments. The sealing process may be performed in an inert atmosphere, e.g., an argon, helium, or nitrogen atmosphere.

In certain embodiments (e.g., as shown in FIGS. 8 and 9), the upper edge surface 302b of the first tube segment 302 defines an upwardly opening first segment depression 302c, and the elemental silicon powder, chunks or granules are applied to at least a portion of the first segment depression 302c. When the lower edge surface 304d of the second tube segment is brought into contact with the upper edge surface 302b of the first segment 302, the downwardly extending protrusion 304e contacts the molten elemental silicon in the first segment depression 302c. The molten silicon solidifies and the space between the second segment protrusion 304e and the first segment depression 302c is filled with silicon 310.

In an independent embodiment, forming a coated edge surface includes placing an elemental silicon wire on at least a portion of the upper edge of the first tube segment, such as within at least a portion of the first segment depression. Heat is applied to the elemental silicon wire to form molten silicon, and the coated edge is then brought into abutment with the second tube segment as described above.

In some embodiments, a curable sealing material comprising a lithium salt is applied to at least a portion of an edge surface of a first tube segment and at least a portion of an edge surface of a second tube segment. The sealing material is applied to the edge surface(s) by any suitable process including spreading, squeezing, wiping, or brushing the sealing material onto the edge surface(s). In some examples, the sealing material is applied using a spatula, a syringe, or a squeezable bag with an aperture or attached nozzle. After bringing the edge surfaces of the first and second segments into abutment, excess sealing material is removed, such as by wiping, before heating the segments to cure the sealing material. Applying heat to the sealing material may include two or more heating steps. In some embodiments, applying heat comprises exposing the sealing material to an atmosphere at a first temperature T1 for a first period of time, increasing the temperature to a second temperature T2, wherein T2>T1, and exposing the sealing material to the second temperature T2 for a second period of time to cure the sealing material. Heat may be applied to the sealing material, or to the sealing material and the abutted first and second segments. The first temperature T1 and first period of time are sufficient to vaporize water from the sealing material. The first temperature T1 desirably is sufficiently low to avoid boiling the water or cracking the sealing material as it dries. In some examples, T1 is within a range of 90-110° C., such as within the range of 90-100° C. or 90-95° C. The first period of time is at least one hour, such as at least two hours or 2-4 hours. The second temperature T2 is within a range of 250-350° C., such as within the range of 250-300° C., 250-275° C. or 255-265° C. The second period of time is at least one hour, such as at least two hours or 2-4 hours. Optionally, the joined segments are further heated from the second temperature T2 to a third temperature T3 and maintained at T3 for a third period of time. The temperature T3 is within a range of 350-450° C., such as within the range of 350-400° C., 360-380° C. or 370-375° C.

When the tube segments are threaded segments (e.g., FIGS. 12 and 13), the sealing material may be a compressed packing material disposed between abutting surfaces of the threads of joined segments. Suitable packing materials include, but are not limited to, graphite. The packing material, e.g., powdered graphite, is applied to the external threads 322, 330 of segments 320, 328, or to the internal threads 326, 332 of segments 324, 328. When the threaded segments are joined, the packing material is compressed between abutting surfaces of the threads, and may provide a leak-tight joint.

In certain embodiments, the assembled tube does not include a sealing material between the tube segments. Instead, tube segments may be assembled as shown in FIG. 6. Upper and/or lower surfaces of the segments may include segment depressions and/or segment protrusions as shown in FIGS. 9 and 11. Alternatively, the segments may be threaded segments as shown in FIGS. 12 and 13. In independent embodiment, upper and lower surfaces of the segments may be flat. The assembled tube may be coated on the inwardly and/or outwardly facing surfaces of the tube segments with a material effective to join the tube segments. For example, inwardly and/or outwardly facing surfaces of the tube segments may be plasma coated with silicon carbide. When coating inwardly facing surfaces of the tube segments, a non-contaminating material is used. For example, inwardly facing surfaces may be plasma coated with silicon carbide comprising less than 1% atomic of boron, less than 1% atomic of phosphorus, less than 1% atomic of aluminum, and less than 5% atomic of total foreign metals as measured by EDX/SEM.

IV. Annealing Process

Although the following discussion proceeds with particular reference to conditions suitable for dehydrogenating granular silicon, embodiments of the disclosed method are suitable for use with many flowable, finely divided solids. A person of ordinary skill in the art of annealing will understand that the temperatures and times referenced infra may differ when the flowable, finely divided solid material is a material other than granular silicon.

Electronic-grade granular silicon desirably includes 5 ppmw or less of hydrogen, preferably less than 1 ppmw hydrogen. Granular silicon produced in a fluidized bed reactor by pyrolytic decomposition of a silicon-bearing gas typically comprises >5 ppmw hydrogen, such as 8-10 ppmw hydrogen. The hydrogen content is reduced by annealing the granular silicon in an annealing device as disclosed herein.

With reference to FIGS. 1, 2 and 6, embodiments of a method for dehydrogenating granular silicon include flowing granular silicon 40 downwardly through a passageway 32 defined by a tube 30 of an annealing device 10 or 14. Advantageously, the granular silicon flows through the passageway as a non-fluidized bed of granular silicon. The tube includes a heating zone 30a, and a residence zone 30b below the heating zone 30a. The tube also may include a cooling zone 30c below the residence zone 30b (FIG. 1). The heating zone 30a is heated to a temperature sufficient to heat the granular silicon to a temperature of 900-1400° C., such as 1000-1300° C., 1100-1300° C., 1100-1200° C., or 1200-1300° C., as the granular silicon flows through the heating zone. The granular silicon is flowed through the heating zone 30a and the residence zone 30b at a flow rate sufficient to maintain the granular silicon within the passageway defined by the tube at a temperature of 900-1400° C. for a residence time effective to provide annealed granular silicon comprising ≤5 ppmw hydrogen, e.g., as determined by ASTM method E-1447.

In an independent embodiment (FIG. 5), the method includes flowing granular silicon downwardly through a tube 30 of an annealing device 12, wherein the tube 30 defines a passageway through which the granular silicon flows. The tube includes a heating zone 30a and a cooling zone below the heating zone 30a. The heating zone 30a is heated to a temperature sufficient to heat the granular silicon to a temperature of 900-1400° C., such as 1000-1300° C., 1100-1300° C., 1100-1200° C., or 1200-1300° C., as the granular silicon flows through the heating zone. The granular silicon is flowed through the heating zone 30a at a flow rate sufficient to maintain the granular silicon within the tube at a temperature of 900-1400° C. for a residence time effective to provide annealed granular silicon comprising 5 ppmw or less hydrogen, e.g., as determined by ASTM method E-1447.

In all of the above embodiments, as granular silicon 40 flows downwardly through the passageway defined by the tube 30, an inert gas 50 is flowed upwardly through the granular silicon in the passageway to minimize agglomeration and/or bridging of silicon granules. As used herein, the term "inert" means non-disruptive to the annealing process. The inert gas also flushes released hydrogen out of the tube, thereby preventing accumulation of $H_2$ gas within the tube. Advantageously, the inert gas has a purity of at least 99.999% by volume to minimize or prevent contamination of the granular silicon. Suitable inert gases include argon, helium, and hydrogen. In some embodiments, the inert gas is argon or helium. In certain embodiments, the inert gas comprises <1 ppm $H_2O$, <2 ppm $O_2$, <10 ppm $N_2$, and less than 0.4 ppm total hydrocarbons. Nitrogen is not suitable for use as inert gas 50 because silicon nitride may form on the surface of the silicon granules at the operating temperatures within the tube.

The inert gas flow rate upwardly through the tube passageway may be regulated by a flow-rate controller 55. The gas flow rate is sufficient to maintain a positive pressure within the tube and compensate for any leakage, but insufficient to fluidize the granular silicon within the tube. The flow rate may be, for example, 80% or less of a flow rate sufficient fluidize the granular silicon within the tube. When the tube has an inner diameter within a range of 5-15 cm and a length within a range of 1.5-2 m, the fluidization flow rate may be within a range of 1-1.5 $m^3$/hr. Thus, the selected gas flow rate is less than 1 $m^3$/hr per tube. In some embodiments, the gas flow rate is within a range of 0.1-0.4 $m^3$/hr, such as a rate of 0.2-0.3 $m^3$/hr. The inert gas 50 typically is introduced into the annealing device at ambient temperature (e.g., 20-25° C.).

In any or all of the above embodiments, as granular silicon 40 flows downwardly through the passageway 32 defined by the tube 30, a vibratory force may be applied to the tube to minimize agglomeration and/or bridging of silicon granules. A vibratory force is any force that vibrates the tube and/or the granular silicon within the passageway. The vibratory force may be applied by a vibrator 200 (see, e.g., FIG. 1). Vibrator 200 may be, for example, an external electromechanical or pneumatic-mechanical vibratory device. In an independent embodiment, a vibratory force may be applied to granular silicon 40 within the tubes 30 by pulsing the gas flow from the gas source 50 via the flow rate controller 55.

The downward flow rate of the granular silicon is controlled, at least in part, by the metering device 60. The granular silicon mass flow rate is selected to provide a residence time of the granular silicon at a temperature of 900-1400° C. within the tube for at least 5 minutes, at least 10 minutes, or least 30 minutes, such as for 5 minutes-10 hours, 10 minutes-10 hours, 30 minutes-10 hours, 30-minutes-5 hours, 30 minutes-2 hours, or 30-60 minutes. The temperature and residence time are selected to provide annealed granular silicon comprising 5 ppmw or less hydrogen, e.g., as determined by ASTM method E-1447. In some embodiments, the temperature and residence time are selected to provide annealed granular silicon comprising <1 ppmw hydrogen. Generally, as the temperature is increased, the residence time can be decreased. Advantageously, the method is a continuous-flow method, providing a substantially constant mass flow rate of the granular silicon through the tube. A substantially constant mass flow rate means that the mass flow rate varies by less than ±10% relative to an average mass flow rate of the granular silicon through the tube and/or that the mass flow rate varies by less than ±10% throughout the length of the passageway defined by the tube.

The inner diameter $ID_T$ of the tube determines the maximum mass of silicon that can be present within a given length of the tube, and influences the transient time, i.e., the time required for the granular silicon proximate the central axis $A_T$ of the tube to reach the desired temperature of 900-1400° C. Because different gases have different thermal conductivities, the composition of the inert gas 50 also affects the transient time required to heat the granular silicon. For example, using a thermal conductivity model (Henriksen, *Adsorptive hydrogen storage: experimental investigation on thermal conduction in porous media*, NTNU-Trondheim 2013, p. 29), it is estimated that the effective thermal conductivity ($k_{eff}$) of argon is 0.74 Wm$^{-1}$K$^{-1}$ at a temperature of 911 K (an estimate of the average temperature throughout the entire length $L_T$ of the tube). In contrast, helium has an estimated $k_{eff}$ of 3.1 Wm$^{-1}$K$^{-1}$ at 911 K. It therefore takes considerably longer to heat the granular silicon to 900-1400° C. when argon is the inert gas, and the granular silicon mass flow rate is reduced to provide a sufficient residence time for the granular silicon at the desired temperature.

Accordingly, the selected mass flow rate is based at least in part on (i) the inner diameter of the tube, (ii) the length of the heating zone (and residence zone if present) of the tube, and (iii) the composition of the inert gas. The mass flow rate is controlled by the metering device to provide a residence time of at least 5 minutes at a temperature from 900-1400° C., such as a residence time of at least 30 minutes at a temperature of 1200-1300° C. In some examples, the residence time is 30 minutes-10 hours, 30 minutes-5 hours, 30 minutes-2 hours, or 30-60 minutes. In some embodiments, the tube has an inner diameter within a range of 5-15 cm and a combined heated zone and residence zone length within a range of 1.5-2 m, and the mass flow rate is within a range of 10-60 mm/minute. Stated in other terms, the mass flow rate per tube may be 10-40 kg/hr, such as 15-35 kg/hr.

The heating zone of the tube is maintained at a desired temperature by application of heat from a heat source. The heat source heats the outer surface of the heating zone of the tube to a temperature≥900° C., such as to a temperature of 900-1400° C., thereby heating the granular silicon in the passageway to a temperature of at least 1000° C. In some embodiments, the granular silicon is heated to a temperature of 1000-1300° C. or 1100-1300° C. The temperature of the granular silicon in the passageway is maintained at a temperature<1400° C. to avoid melting the silicon granules. In some embodiments, the temperature of the granular silicon in the passageway is maintained at a temperature<1300° C. to minimize or prevent agglomeration/bridging and/or sintering of silicon granules. In some examples, the outer surface is heated to a temperature of 1125-1250° C. Granular silicon 40 in the passageway 32 is heated by radiant heat transferred from the tube 30 (FIGS. 1, 2, 5, and 6) to the granular silicon. Suitable heat sources include, but are not limited to, a source of a heated gas 70a that flows along the outer surface of the heating zone 30a, one or more heaters 70b positioned within the shell 20 at a height corresponding to the heating zone 30a, or a heating rod 70c positioned within a portion of the passageway 32 corresponding to the heating zone 30a.

The disclosed method may further include discharging the annealed granular silicon from the tube 30 into a receiving system 65. Advantageously, at least a portion of the interior of the receiving system contains an inert gas atmosphere to prevent hydrogen absorption by the annealed granular silicon. Suitable inert gases include, but are not limited to, argon, helium. Nitrogen also may be suitable if the silicon granules are cooled prior to discharge from the tube In some embodiments, the tube 30 includes a cooling zone 30c below the residence zone 30b (FIG. 1) or directly below the heating zone 30a (FIG. 5), and the annealed granular silicon is cooled to a temperature<600° C., such as a temperature<500° C., <300° C., <200° C. or <100° C., prior to discharging the annealed granular silicon from the tube. In certain examples, the granular silicon is cooled to a temperature<300° C., <200° C., <100° C., <75° C. or <50° C., such as to a temperature within a range of 10-300° C., 10-200° C., 10-100° C., 20-75° C., or 20-50° C. The tube may be cooled, for example, by flowing an unheated gas 80 (e.g., a gas having a temperature not greater than 30° C.) along an outer surface of the cooling zone 30c of the tube. Advantageously, the unheated gas is introduced at a lower portion of the cooling zone 30c and flows upwardly along the outer surface of the cooling zone of the tube. In some embodiments, the unheated gas 80 is at ambient temperature (e.g., 20-25° C.) when initially contacting the outer surface of the cooling zone. As the gas 80 flows upwardly along the outer surface of the tube 30, heat is transferred from the tube to the gas, thereby cooling the granular silicon 40 prior to discharge from the tube. In some examples, the gas 80 is initially at ambient temperature and reaches a temperature of 500-700° C. as it flows upwardly along the outer surface of the cooling zone 30c.

As shown in FIGS. 1, 5, and 6, the annealing device 10, 12, 14 may include one or more tubes 30 within the shell 20. In some embodiments, the tubes are arranged in parallel within the shell. In FIG. 1, baffles 90a-d divide the interior space 21 within the shell into three chambers—heating chamber 21a, residence chamber 21b, and cooling chamber 21c. In FIG. 5, baffles 90a, 90b, and 90d divide the interior space within the shell into two chambers, heating chamber 21a and cooling chamber 21c. In FIG. 6, baffles 90a, 90b, and 90d divide the interior space within the shell into two chambers, heating chamber 21a and residence chamber 21b. In each embodiment, baffle 90a and the upper portion 27 of the shell together also define an upper chamber 27a; baffle 90d and the lower portion 22 of the shell together also define a lower chamber 22a.

In the exemplary embodiments of FIGS. 1 and 5, the annealing device 10, 12 further includes a gas circulation system 100 for heating the contents of the heating chamber 21a and cooling the contents of the cooling chamber 21c. An unheated gas 80 is blown through a cooling zone inlet 23 into the cooling chamber 21c, which is defined by a portion of the shell 20 and baffles 90c, 90d of FIG. 1 or baffles 90b, 90d of FIG. 5; the cooling zone inlet 23 is positioned adjacent and above the baffle 90d. The gas flows upwardly along outer surfaces 31c of the cooling zones 30c of the tubes 30 and exits through the cooling zone outlet 26, which is positioned above the cooling zone inlet 23 and below the baffle 90c (FIG. 1) or 90b (FIG. 5). The gas, which has absorbed heat from the cooling zone, flows upwardly through conduit 120 and through a heater 150, which increases the gas to a temperature suitable for heating the heating zone 30a, e.g., a temperature of at least 900° C., such as a temperature of 900-1400° C. or 1000-1300° C. The heated gas enters the heating chamber 21a, which is defined by a portion of the shell 20 and the first and second baffles 90a, 90b via a heating zone inlet 25 positioned above the baffle 90b. The heated gas 70a flows upwardly along outer surfaces 31a of the heating zones 30a of the tubes 30, transferring heat to the tubes 30. The heated gas exits through the heating zone outlet 24, which is positioned above the heating zone inlet 25 and below the baffle 90a. As the heated gas flows from the heating zone inlet 25 to the heating zone inlet 24, its temperature may fall to about 600-700° C. The gas flows through conduit 110 to cooler 160, which cools the gas to a temperature<100° C., such as to a temperature less than 50° C. or to ambient temperature (e.g., 20-25° C.), before being returned to the cooling chamber 21c via the blower 140 and the cooling zone inlet 23.

As needed, additional gas is added to gas circulation system 100 via a gas source 130. Additional gas may be needed, for example, if one or more baffles 90a-d is not gas-tight, or if any of the tubes 30 is not gas-tight. A segmented tube, for example, may develop a leak at a joint. Alternatively, while unlikely, a tube may crack during operation of the annealing device. Accordingly, in some embodiments, the gas provided by gas source 130 and circulating through the gas circulation system is an inert gas with a purity of at least 99.999% by volume as described previously.

In the exemplary embodiment of FIG. 6, the annealing device 14 includes a gas circulation system 102 for heating the contents of the heating chamber 21a. A gas flows through heater 150, which increases the gas to a temperature of at least 900° C., such as a temperature of 900-1400° C. or 1000-1300° C. The gas is blown via blower 140 through the heating zone inlet 25 into the heating chamber 21a, which is defined by a portion of the shell 20 and baffles 90a and 90b. The heated gas 70a flows upwardly along outer surfaces 31a of the heating zones 30a of the tubes 30, transferring heat to the tubes 30. The heated gas exits through the heating zone outlet 24, which is positioned above the heating zone inlet 25 and below the baffle 90a. As the heated gas flows from the heating zone inlet 25 to the heating zone inlet 24, its temperature may fall to about 600-700° C. The gas flows through conduit 110 to heater 150, which reheats the gas to a suitable temperature. As needed, additional gas is added to the gas circulation system 102 via a gas source 130.

When the tube(s) 30 are constructed of silicon carbide, the gas provided by the gas source 130 may include a trace amount of oxygen to reduce or prevent erosion of the silicon carbide. Silicon carbide tubes typically have an oxide layer on the outer surface of the tube. When the gas provided by gas source 130 is devoid of oxygen, the oxidized silicon carbide layer erodes at the operating temperatures of the annealing device and the underlying silicon carbide may erode over time, weakening the tube. Including a trace amount of oxygen in the circulating gas suppresses erosion of the oxidized layer and may prolong the lifetime of the tube.

Granular silicon generally includes at least some surface silicon oxide on the granules. Under annealing conditions (e.g., 900-1400° C.), silicon may react with $SiO_2$ to form silicon monoxide (SiO) gas.

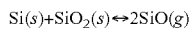

$$Si(s)+SiO_2(s) \leftrightarrow 2SiO(g)$$

SiO condenses and forms solid deposits in cooler regions of the annealing device. The formation of additional silicon oxide is minimized by maintaining an inert atmosphere within the tube(s) 30. Trace amounts (e.g., <10 ppmw, such as <2 ppmw) of oxygen in the inert gas flowing through the tubes may contribute to the formation of silicon oxide. Under steady-state conditions in the heated and residence zones of the tube, SiO formation is substantially self-controlling due to the above equilibrium. Little or no SiO(s) accumulation in the hot zone is expected. However, effluent gases 52 flowing out of the upper end 32a of passageway 32 (FIGS. 1, 2, 5, and 6) include inert gas 50, $H_2$ gas that has diffused out of the silicon granules, and SiO (g). As the effluent gases 52 cool, SiO may condense in the upper chamber 22a and/or conduit 170.

In some embodiments, SiO fouling is reduced by maintaining the interior of the upper chamber 27a, the gas outlet 28, and optionally at least a portion of the conduit 170 at a temperature≥900° C., such as ≥1000° C., to minimize SiO(s) deposition. A volatile species trap 180 (e.g., a cold trap or condensing device) may be installed downstream from the gas outlet 28 to provide a location for SiO(s) deposition and subsequent removal from the system. The temperature within the volatile species trap may be <1000° C., such as <800° C., <500° C., or <200° C. Optionally, gases that do not condense in the volatile species trap 180 (e.g., inert gas 50 and $H_2$) may be recycled to the lower chamber 22a via conduit 190 and flow-rate controller 55.

Although embodiments of the disclosed annealing device are useful for continuous operation, additional factors are considered during conditions in which a disruption of normal operation has occurred. For example, during start up, care is taken to minimize thermal stresses on the system, particularly the tubes, and to prevent hydrogen-containing silicon from intermixing with annealed product. Thermal shock due to a large temperature difference between the granular silicon and the tube may crack or break the tube. A peak-stress calculation can be performed to determine the maximum tolerated thermal shock of the tube material. Upon start up, the tube is filled with an initial charge of granular silicon before the tube is heated to the desired operating temperature. The heating zone and granular silicon are concurrently heated to an initial operating temperature of 750-1400° C., such as an initial operating temperature of 900-1400° C. or 1000-1300° C. Inert gas may be flowed upwardly through the tube while heating the tube and granular silicon to the operating temperature. In some embodiments, the flow of inert gas is initiated before filling the tube with granular silicon, thereby ensuring an inert atmosphere in the tube at start up. In some embodiments, the metering device is closed while the heating zone is heated to at least 750° C. Granular silicon discharged from the bottom of the tube during the start-up process may not have been heated to an effective temperature and/or for a sufficient period of time to reduce the hydrogen content to less than 5 ppmw, resulting in under-annealed granular silicon. In one embodiment, the under-annealed granular silicon is collected and either discarded or recycled to the heating zone of the tube. In another embodiment, the initial charge comprises previously annealed granular silicon comprising <5 ppmw hydrogen, such as <1 ppm hydrogen, e.g., as determined by ASTM method E-1447. A mass flow rate effective to provide a residence time of at least 30 minutes in the heating zone (and residence zone, if present) of the tube is established by adjusting the metering device.

If the flow of granular silicon through the heated tube ceases (e.g., due to a full or partial blockage), the temperature within the heating zone (and the residence zone, if present) of the tube is reduced to <1000° C. or <900° C., and/or an upward flow of inert gas is maintained to prevent agglomeration of the static bed of granular silicon. If air is introduced into the tube while granular silicon is present, the granular silicon is assumed to be compromised due to oxygen and nitrogen contamination. Compromised product is discarded or recycled through the annealing device.

Advantageously, in addition to reducing the hydrogen content of the granular silicon, the annealing process reduces a dust content of the granular silicon. Annealing heats the surface of silicon granules to a temperature sufficient to adhere at least a portion of any dust to the granules. At elevated temperatures below the melting point, granular particles with high surface energy are able to attain lower energy that results in fusion of dust particles to the granular surface and relatively fine surface features. Dust content is thereby reduced without any loss of granular silicon product. Nonetheless, in some embodiments, it may be desirable to reduce a dust content of the granular silicon before annealing the granular silicon. Dust content may be reduced by any suitable method including, but not limited to, washing the granular silicon, tumbling the granular silicon in a tumbling device or using a zigzag classifier (e.g., as described in US 2016/0129478 A1, which is incorporated herein by reference).

Figure 18:
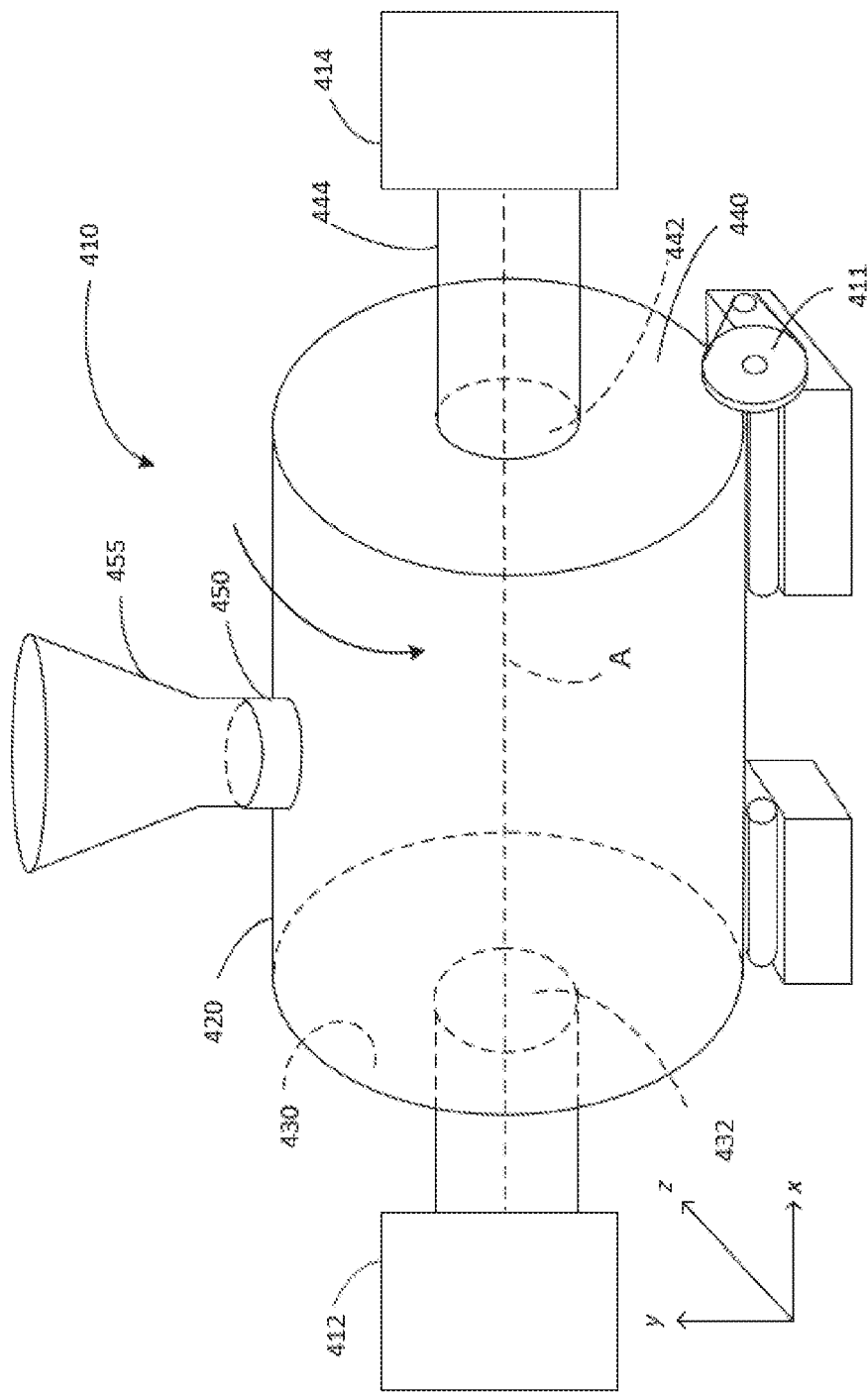
FIG. 18 is a schematic view of a prior art tumbling device.

In an exemplary embodiment as shown in FIG. 18, granular silicon is introduced into a tumbling device including a tumbler drum 410 and a source of motive power 411 operable to rotate the tumbler drum. The tumbler drum 410 has a longitudinal axis of rotation A, a side wall 420, a first end wall 430 defining a gas inlet 432, and a second end wall 440 defining an outlet 442. The tumbler drum may include a port 450 extending through the side wall 420 for introduction of granular polysilicon into the tumbler drum 410 and removal of de-dusted granular silicon from the drum 410. A source of sweep gas 412 is connected to gas inlet 432 to provide a sweep gas flow longitudinally through the chamber 422. A dust collection assembly 414 is operably connected to outlet 442 to collect dust removed from the granular polysilicon. A method for reducing the dust content includes introducing the granular silicon into the tumbler drum and rotating the tumbler drum for a period time while flowing a sweep gas through the tumbler drum, thereby entraining dust in the sweep gas. The sweep gas and entrained dust are passed through an outlet of the tumbler drum, and the tumbled granular silicon is removed from the tumbler drum. The tumbled granular silicon comprises a reduced percentage by weight of dust than the introduced granular silicon.

Figure 19:
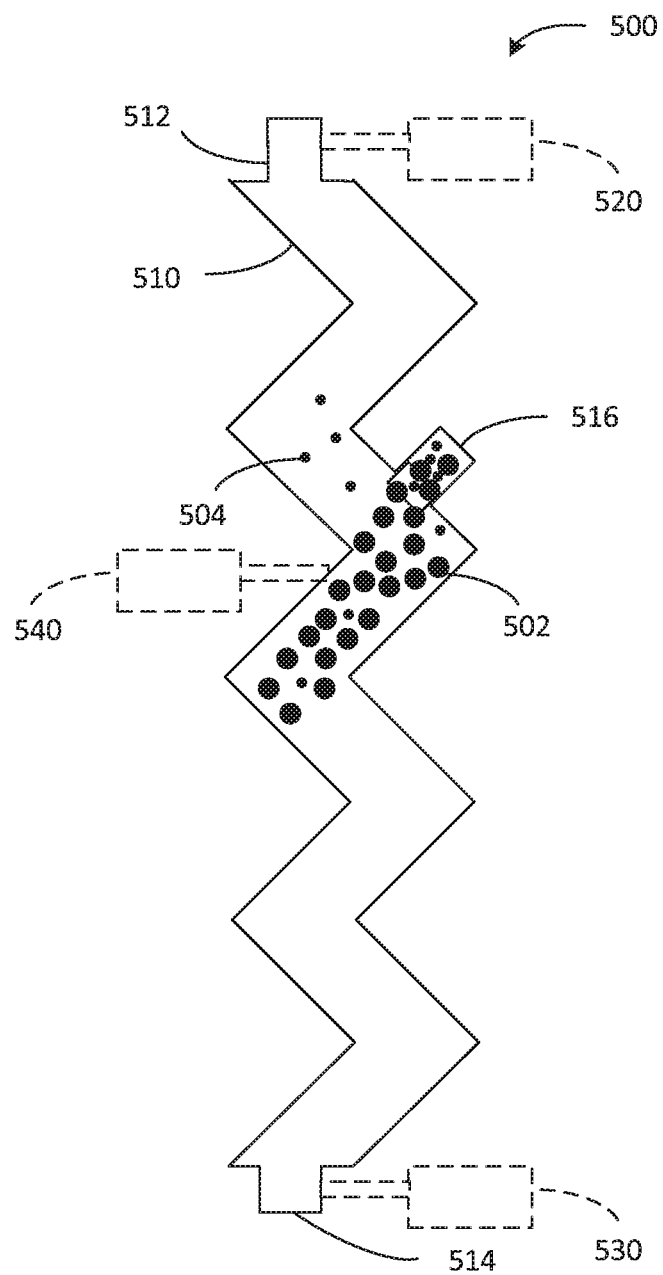
FIG. 19 is a schematic view of a prior art zigzag classifier.

In another exemplary embodiment as shown in FIG. 19, a zigzag classifier 500 is used to separate dust from granular silicon. A mixture of granular silicon 502 and dust 504 is introduced into a baffle tube 510 via an intermediate port 516. In one embodiment, the material is introduced via a vibrating feeder (not shown). The material may be introduced through a polyurethane tube (not shown). As the material traverses downwardly through the baffle tube 510, at least a portion of the dust 504 is entrained in air, or inert gas, flowing upwardly from lower opening 514 to upper opening 512. Upward gas flow is produced by an external gas source 530 fluidly connected to lower opening 514. Alternatively, upward gas flow is produced by action of the vacuum source 520, which maintains a negative, or subambient, pressure at the baffle tube 510 and upper opening 512, and draws ambient air or gas up through the baffle tube 510. Optionally, an external source 540 of a cross-flowing gas is provided below intermediate port 516. Entrained dust 504 is removed through upper opening 512, and a polysilicon material comprising granular silicon 502 and a reduced quantity of dust 504 is collected through lower opening 514.

IV. Examples

Trials were conducted to determine annealing conditions effective to reduce hydrogen concentration in granular silicon to less than 1 ppmw. Hydrogen measurement was performed using a temperature programmed desorption (TPD) method. The measurement can also be performed by ASTM method E-1447. A transient heat conduction model for a tube having a cylindrical geometry was developed to determined desired temperature and time conditions. The model was used to predict the time for the tube center to reach 1200° C., i.e., the "transient time." The transient time was determined for various tube diameters and for different inert gas atmospheres. The model assumed that the outer surface of the tubes was held at a constant 1250° C. Tube wall thickness and material (SiC) conductivity were also factored into the model.

Thermal conductivity ($k_{eff}$) of the granular bed (silicon plus the inert gas) was measured for argon and helium at 100° C.; thermal conductivities at higher temperatures were estimated from the ZBS thermal conductivity model (Henriksen, *Adsorptive hydrogen storage: experimental investigation on thermal conduction in porous media*, NTNU-Trondheim 2013, p. 29). The entrance of the tubes, where the cold granular silicon enters the tube, requires the highest heat flux (W/m² tube surface area). At the entrance, the heat flux is infinite. As the material warms, heat flux demand decreases rapidly. Once the temperature at the central axis reaches 1200° C., the heat load is minimal and the magnitude of the heat load depends on heat losses to the surroundings. It was estimated that the effective thermal conductivity ($k_{eff}$) of argon is 0.74 Wm$^{-1}$K$^{-1}$ at a temperature of 911 K (an estimate of the average temperature throughout the entire length $L_T$ of the tube). Helium was estimated to have a $k_{eff}$ of 3.1 Wm$^{-1}$K$^{-1}$ at 911 K. The number of tubes required for a desired mass flow rate depends on the size of the tubes and the total annealing time, and can be calculated from the following equation:

$$M = N*(\pi/4)*(d_{tube})*(L)*(1/t_{anneal})*(\rho_{bulk})$$

where M=total mass flow rate of granular Si (kg/hr; e.g., 440 kg/hr); N=number of tubes; $d_{tube}$=internal diameter of tube, m; L=length of tube (heating zone+residence zone), m; t=total annealing time (transient+dwell time), hr; and $\rho_{bulk}$=bulk density of granular silicon, i.e., 1600 kg/m³. Total annealing time is calculated from the transient time based on the thermal conductivity model and a dwell time of 30 minutes. For tubes having an internal diameter of 100 mm, transient time to reach 1200° C. at the central axis was determined to be 53 minutes when argon was the purge gas, and 13 minutes when helium was the purge gas.

Tables 1 and 2 summarize exemplary design considerations and operating conditions for SiC tubes having a hot zone (heating zone+residence zone) length $L_H$ of 2.0 m and 1.5 m, respectively. The inert purge gases are argon and helium.

TABLE 1

SiC tubes, $L_H$ = 2.0 m

|  | Argon | Helium |
| --- | --- | --- |
| Granular silicon, kg/hr | 440 | 440 |
| Annealing temperature (central axis), ° C. | 1200 | 1200 |
| Tube outer surface temperature, ° C. | 1250 | 1250 |
| Total annealing time, min | 83 | 43 |
| Transient time, min | 53 | 13 |
| Dwell time at 1200° C., min | 30 | 30 |
| Tube internal diameter, mm | 100 | 100 |
| Tube hot zone length, $L_H$, mm | 2000 | 2000 |
| Number of tubes | 25 | 13 |
| Moving speed of granular Si bed in tubes, mm/min | 23 | 45 |
| Inert gas flow rate per tube, m³/hr, @ normal conditions (0° C., 1 atm.) | 0.2-0.3 | 0.2-0.3 |
| Maximum fluidization flow rate in the tubes to avoid fluidization, m³/hr, @ normal conditions (0° C., 1 atm.) for dsv* = 1.0 mm | 1.1 | 1.3 |

*dsv = surface-volume diameter, also known as the Sauter mean diameter; defined as the diameter of a sphere that has the same volume/surface area ratio as a particle of interest. The reported dsv is an average value.

TABLE 2

SiC tubes, $L_H$ = 1.5 m

|  | Argon | Helium |
| --- | --- | --- |
| Granular silicon, kg/hr | 440 | 440 |
| Annealing temperature (central axis), ° C. | 1200 | 1200 |
| Tube outer surface temperature, ° C. | 1250 | 1250 |
| Total annealing time, min | 83 | 43 |
| Transient time, min | 53 | 13 |
| Dwell time at 1200° C., min | 30 | 30 |
| Tube internal diameter, mm | 100 | 100 |
| Tube hot zone length, $L_H$, mm | 1500 | 1500 |
| Number of tubes | 33 | 17 |
| Moving speed of granular Si bed in tubes, mm/min | 18 | 34 |
| Inert gas flow rate per tube, m³/hr, @ normal conditions (0° C., 1 atm.) | 0.2-0.3 | 0.2-0.3 |
| Maximum fluidization flow rate in the tubes to avoid fluidization, m³/hr, @ normal conditions (0° C., 1 atm.) for dsv = 1.0 mm | 1.1 | 1.3 |

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A continuous-flow annealing device for annealing flowable, finely-divided solids, the device comprising:
   a shell;
   one or more tubes arranged within the shell, each tube having an open upper end and an open lower end that is located below the upper end and defining a passageway that extends between the upper end and the lower end, and each tube comprising a heating zone, the heating zone having a lower boundary;
   a heat source for heating the heating zones of the one or more tubes;
   an inert gas source in fluid communication with the interior of a lower portion of the shell and, thereby, the open lower end of each tube;
   a flow-rate controller for controlling a flow rate of inert gas from the inert gas source;
   a metering device coupled to a lower portion of the shell; and
   at least one baffle within the shell, the baffle defining one or more apertures that are dimensioned and positioned to receive the one or more tubes,
   wherein the at least one baffle is positioned at a height corresponding to the lower boundary of the heating zone,
   the shell comprises (i) a heating zone inlet at a height above the baffle and (ii) a heating zone outlet at a height above the heating zone inlet, and
   the heat source is a source of heated gas and is in fluid communication with the heating zone inlet.

2. The annealing device of claim 1, wherein the heat source comprises one or more heaters positioned within the shell at a height corresponding to the height of the heating zones of the one or more tubes.

3. The annealing device of claim 1, wherein the heat source comprises a heating rod positioned within a portion of the passageway of each tube at a height corresponding to the height of the heating zone.

4. The annealing device of claim 1, wherein each tube further comprises a residence zone located below the heating zone.

5. The annealing device of claim 1, wherein each tube further comprises a cooling zone located below the heating zone.

6. The annealing device of claim 1, further comprising a vibrator positioned to vibrate the one or more tubes when the annealing device is in operation.

7. The annealing device of claim 1, wherein the tubes are constructed of silicon nitride, nitride-bonded silicon carbide, graphite, or a combination thereof.

8. The annealing device of claim 7, wherein each of the tubes comprises a plurality of abutted tube segments.

9. The annealing device of claim 8, wherein each tube segment comprises a tubular wall having an annular upper surface and an annular lower surface.

10. The annealing device of claim 1, wherein the one or more tubes comprises from 2 to 50 tubes.

11. The annealing device of claim 1, further comprising a receiving system coupled to the metering device, wherein the receiving system is in fluid communication with the interior of the lower portion of the shell when the metering device is operating.

12. The annealing device of claim 11, wherein the flowable, finely divided solids are granular silicon, and surfaces of the receiving system that contact the annealed granular silicon comprise silicon carbide, silicon nitride, or a combination thereof.

13. The annealing device of claim 1, further comprising a source of flowable, finely-divided solids coupled to an upper portion of the shell.

14. The annealing device of claim 1, further comprising a gas outlet that extends through an upper portion of the shell and is in fluid communication with the open upper end of each of the one or more tubes.

15. The annealing device of claim 14, further comprising a volatile species trap in fluid communication with the gas outlet.

16. The annealing device of claim 1, wherein the inert gas comprises argon, helium, or hydrogen.

17. A continuous-flow annealing device for annealing flowable, finely-divided solids, the device comprising:
- a shell;
- one or more tubes arranged within the shell, each tube having an open upper end and an open lower end that is located below the upper end and defining a passageway that extends between the upper end and the lower end, and each tube comprising a heating zone, each tube further comprising a residence zone located below the heating zone and a cooling zone located below the residence zone, wherein the heating zone has a lower boundary, the cooling zone has an upper boundary, and the shell has an upper portion and a lower portion;
- a heat source for heating the heating zones of the one or more tubes;
- an inert gas source in fluid communication with the interior of a lower portion of the shell and, thereby, the open lower end of each tube;
- a flow-rate controller for controlling a flow rate of inert gas from the inert gas source;
- a metering device coupled to a lower portion of the shell;
- a first baffle positioned within the shell at a height corresponding to the heating zone, the first baffle defining a plurality of apertures that are dimensioned and positioned to receive the plurality of tubes, wherein the first baffle and the upper portion of the shell together define an upper chamber;
- a second baffle positioned within the shell at a height below the first baffle and at a height corresponding to the lower boundary of the heating zone, the second baffle defining a plurality of apertures that are dimensioned and positioned to receive the plurality of tubes, wherein the first and second baffles together with the shell define a heating chamber;
- a third baffle positioned within the shell at a height corresponding to the upper boundary of the cooling zone, the third baffle defining a plurality of apertures that are dimensioned and positioned to receive the plurality of tubes, wherein the second and third baffles together with the shell define a residence chamber; and
- a fourth baffle positioned within the shell at a height below the third baffle, the fourth baffle defining a plurality of apertures that are dimensioned and positioned to receive the plurality of tubes, wherein the third and fourth baffles together with the shell define a cooling chamber, and the fourth baffle and the lower portion of the shell together define a lower chamber.

18. The annealing device of claim 17, wherein the shell further comprises:
- a heating zone inlet located at a height corresponding to the heating chamber;
- a heating zone outlet located at a height above the heating zone inlet and at a height corresponding to the heating chamber;
- a cooling zone inlet located at a height corresponding to the cooling chamber;
- a cooling zone outlet at a height above the cooling zone inlet and at a height corresponding to the cooling chamber.

19. The annealing device of claim 18, further comprising:
- a source of unheated gas in fluid communication with the cooling zone inlet;
- a first conduit in fluid communication with the cooling zone outlet and the heating zone inlet, wherein the heat source is a heater positioned to heat a portion of the first conduit;
- a second conduit in fluid communication with the heating zone outlet and the cooling zone inlet;
- a cooler positioned to cool a portion of the second conduit; and
- a blower for circulating a gas through the cooling chamber, the first conduit, the heating chamber, and the second conduit.

20. The annealing device of claim 17, wherein the inert gas comprises argon, helium, or hydrogen.

* * * * *